United States Patent
Shen et al.

(10) Patent No.: US 10,084,392 B2
(45) Date of Patent: Sep. 25, 2018

(54) FIVE-LEVEL INVERTER AND APPLICATION CIRCUIT OF THE SAME

(71) Applicant: Sungrow Power Supply Co., Ltd., Anhui (CN)

(72) Inventors: Tan Shen, Anhui (CN); Peng Wang, Anhui (CN); Houlai Geng, Anhui (CN); Bing Hu, Anhui (CN); Wei Bie, Anhui (CN); Shangfang Dai, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 43 days.

(21) Appl. No.: 15/272,857

(22) Filed: Sep. 22, 2016

(65) Prior Publication Data

US 2017/0104424 A1    Apr. 13, 2017

(30) Foreign Application Priority Data

Oct. 10, 2015  (CN) .......................... 2015 1 0662002
Oct. 22, 2015  (CN) .......................... 2015 1 0690512

(51) Int. Cl.
*H02M 7/487*   (2007.01)
*H02M 7/537*   (2006.01)
(Continued)

(52) U.S. Cl.
CPC ............ *H02M 7/537* (2013.01); *H02M 1/12* (2013.01); *H02M 1/44* (2013.01)

(58) Field of Classification Search
CPC .................................................... H02M 7/487
See application file for complete search history.

(56) References Cited

U.S. PATENT DOCUMENTS

| 2008/0315859 | A1 | 12/2008 | Ponnaluri et al. |
| 2011/0170322 | A1 | 7/2011 | Sato et al. |

(Continued)

FOREIGN PATENT DOCUMENTS

| CN | 101262180 A | 9/2008 |
| CN | 103595281 A | 2/2014 |

(Continued)

OTHER PUBLICATIONS

Extended European Search Report corresponding to Application No. 16190482.6-1809; Feb. 21, 2017.
(Continued)

*Primary Examiner* — Timothy J Dole
*Assistant Examiner* — Ishrat Jamali
(74) *Attorney, Agent, or Firm* — Cantor Colburn LLP

(57) ABSTRACT

A five-level inverter and its application circuit are provided. The five-level inverter is enabled to output multiple levels of voltage by controlling different conduction combinations of first, second, third, fourth, fifth, sixth, seventh, and eighth switch transistors, as well as a clamping capacitor. Two conduction combinations may be selected for outputting a positive voltage, with currents flowing through the clamping capacitor in opposite directions in the two conduction combinations. Therefore the voltage of the clamping capacitor can be balanced by controlling the two conduction combinations. Similarly, when outputting a negative voltage, the voltage of the clamping capacitor can be balanced by controlling other two conduction combinations. Therefore, a balance of power capacitor voltage can be achieved at full power and full modulation without adding an extra hardware circuit.

24 Claims, 11 Drawing Sheets

(51) Int. Cl.
*H02M 1/12* (2006.01)
*H02M 1/44* (2007.01)

(56) References Cited

U.S. PATENT DOCUMENTS

| | | | | |
|---|---|---|---|---|
| 2013/0301314 A1* | 11/2013 | Fu | ......................... | H02M 7/487 363/37 |
| 2013/0314957 A1 | 11/2013 | Gupta et al. | | |
| 2014/0313802 A1 | 10/2014 | Kuwahara | | |
| 2015/0085541 A1* | 3/2015 | Hu | ......................... | H02M 7/487 363/71 |
| 2015/0155770 A1 | 6/2015 | Ying et al. | | |

FOREIGN PATENT DOCUMENTS

| | | |
|---|---|---|
| CN | 104335473 A | 2/2015 |
| EP | 2306629 A2 | 4/2011 |
| JP | 2009232619 A | 10/2009 |
| JP | 2012029384 A | 2/2012 |
| JP | 2012182974 A | 9/2012 |
| JP | 2014217079 A | 11/2014 |
| WO | 2010044164 A1 | 4/2010 |

OTHER PUBLICATIONS

Juhamatti Korhonen et al., "Hybrid five-level T-type inverter", 2014, pp. 1506-1511.
Juhamatti Korhonen, et al. "Five-level inverter with a neutral point connection and a flying capacitor" Vacon, Inc, pp. 8.
Xibo Yuan, "A New Five-level Converter for Low-Voltage Motor Drive Applications", 17th International Conference on Electrical Machines and Systems (ICEMS) Oct. 22-25, 2014, pp. 6.
JP Notification of Reasons for Refusal corresponding to Application No. 2016-197915; dated Jan. 9, 2018.
CN First Office Action corresponding to Application No. 201510690512. X; dated May 2, 2017.

* cited by examiner

FIVE-LEVEL INVERTER AND APPLICATION CIRCUIT OF THE SAME

CROSS REFERENCE TO PRIOR APPLICATIONS

The present application claims priority to Chinese Patent Application No. 201510690512.X, titled "FIVE-LEVEL INVERTER AND APPLICATION CIRCUIT OF THE SAME", filed on Oct. 22, 2015 with the State Intellectual Property Office of People's Republic of China and Chinese Patent Application No. 201510662002.1, titled "FIVE-LEVEL INVERTER AND APPLICATION CIRCUIT OF THE SAME", filed on Oct. 10, 2015 with the State Intellectual Property Office of People's Republic of China, which are incorporated herein by reference in their entirety.

FIELD

The present disclosure relates to the technical field of photovoltaic new energy, and in particular to a five-level inverter and an application circuit of the same.

BACKGROUND

Recently, the technology of multi-level output becomes popular in the field of medium-high voltage high power frequency conversion. A multi-level inverter can output a voltage waveform having a low voltage change ratio because of a large number of output voltage steps. Also, the harmonic wave of the output voltage is reduced with the increasing number of the output levels. Furthermore, the multi-level inverter technology has good performance on reducing the switching loss and conduction loss of a system and reducing the withstand voltage of a transistor and the electromagnetic interference of a system. Therefore, multi-level inverters are employed commonly at present.

In the conventional technology, a typical diode clamping multi-level inverter outputting three levels or more is implemented by connecting in parallel multiple power capacitors connected in series to a direct-current side of a photovoltaic inverter, as shown in FIG. 1. Various switch transistors in the inverter are connected to respective power capacitors through power diodes respectively. Since the power capacitors output unequal power, the voltages across the power capacitors are unequal, i.e., a phenomenon of so-called unbalance power capacitor voltage occurs.

Therefore, the multi-level inverter in the conventional technology lacks of a function of power capacitor voltage self-balance.

SUMMARY

According to the present disclosure, a five-level inverter and an application circuit of the same are provided to solve the problem that the multi-level inverter in the conventional technology lacks of a function of power capacitor voltage self-balance.

In order to achieve the above objective, technical solutions are provided in the present disclosure as follows.

A five-level inverter is connected between a positive terminal and a negative terminal of a direct-current power supply, and is connected in parallel to a branch in which a first capacitor is connected in series to a second capacitor.

The five-level inverter includes six switch branches, a seventh switch transistor, an eighth switch transistor and a clamping capacitor.

A first switch branch of the six switch branches includes a first unidirectional element and a first switch transistor. A common terminal of the first unidirectional element and the first switch transistor is connected to a first terminal of the first capacitor.

A second switch branch of the six switch branches includes a second unidirectional element and a second switch transistor. A common terminal of the second unidirectional element and the second switch transistor is connected to a first terminal of the first switch branch.

A third switch branch of the six switch branches includes a third unidirectional element and a third switch transistor. A first terminal of the third switch branch is connected to a first terminal of the second switch branch, a second terminal of the first capacitor and a first terminal of the second capacitor.

A fourth switch branch of the six switch branches includes a fourth unidirectional element and a fourth switch transistor. A first terminal of the fourth switch branch is connected to the first terminal of the third switch branch.

A fifth switch branch of the six switch branches includes a fifth unidirectional element and a fifth switch transistor. A first terminal of the fifth switch branch is connected to the first terminal of the fourth switch branch.

A sixth switch branch of the six switch branches includes a sixth unidirectional element and a sixth switch transistor. A first terminal of the sixth switch branch is connected to a common terminal of the fifth unidirectional element and the fifth switch transistor. A common terminal of the sixth unidirectional element and the sixth switch transistor is connected to a second terminal of the second capacitor.

A first terminal of the clamping capacitor is connected to a second terminal of the first switch branch, a second terminal of the second switch branch, a second terminal of the third switch branch and a first terminal of the seventh switch transistor. A second terminal of the clamping capacitor is connected to a second terminal of the fourth switch branch, a second terminal of the fifth switch branch, a second terminal of the sixth switch branch and a second terminal of the eighth switch transistor. A first terminal of the eighth switch transistor is connected to a second terminal of the seventh switch transistor at a connection point connected to an output terminal of the five-level inverter.

Each of the seventh switch transistor and the eighth switch transistor is a switch transistor providing a bidirectional power path.

Preferably, an input terminal of the second unidirectional element is the first terminal of the second switch branch. A second terminal of the second switch transistor is the second terminal of the second switch branch. A first terminal of the second switch transistor is connected to an output terminal of the second unidirectional element at a connection point connected to the first terminal of the first switch branch.

A second terminal of the third switch transistor is the first terminal of the third switch branch. A first terminal of the third switch transistor is connected to an output terminal of the third unidirectional element. An input terminal of the third unidirectional element is the second terminal of the third switch branch.

An input terminal of the fourth unidirectional element is the first terminal of the fourth switch branch. An output terminal of the fourth unidirectional element is connected to a first terminal of the fourth switch transistor. A second terminal of the fourth switch transistor is the second terminal of the fourth switch branch.

An output terminal of the fifth unidirectional element is connected to a second terminal of the fifth switch transistor at a connection point connected to the first terminal of the sixth switch branch. An input terminal of the fifth unidirectional element is the first terminal of the fifth switch branch. A first terminal of the fifth switch transistor is the second terminal of the fifth switch branch.

Preferably, a second terminal of the second switch transistor is the first terminal of the second switch branch. An input terminal of the second unidirectional element is the second terminal of the second switch branch. A first terminal of the second switch transistor is connected to an output terminal of the second unidirectional element at a connection point connected to the first terminal of the first switch branch.

An input terminal of the third unidirectional element is the first terminal of the third switch branch. An output terminal of the third unidirectional element is connected to a first terminal of the third switch transistor. A second terminal of the third switch transistor is the second terminal of the third switch branch.

A second terminal of the fourth switch transistor is the first terminal of the fourth switch branch. A first terminal of the fourth switch transistor is connected to an output terminal of the fourth unidirectional element. An input terminal of the fourth unidirectional element is the second terminal of the fourth switch branch.

A second terminal of the fifth switch transistor is connected to an input terminal of the fifth unidirectional element at a connection point connected to the first terminal of the sixth switch branch. A first terminal of the fifth switch transistor is the first terminal of the fifth switch branch. An output terminal of the fifth unidirectional element is the second terminal of the fifth switch branch.

Preferably, an output terminal of the first unidirectional element is connected to a first terminal of the first switch transistor at a connection point connected to the first terminal of the first capacitor. An input terminal of the first unidirectional element is the first terminal of the first switch branch. A second terminal of the first switch transistor is the second terminal of the first switch branch.

An input terminal of the sixth unidirectional element is connected to a second terminal of the sixth switch transistor at a connection point connected to the second terminal of the second capacitor. An output terminal of the sixth unidirectional element is the first terminal of the sixth switch branch. A first terminal of the sixth switch transistor is the second terminal of the sixth switch branch.

Each of the second switch transistor, the third switch transistor, the fourth switch transistor and the fifth switch transistor includes a body diode or is connected in reverse-parallel to a diode.

Preferably, an output terminal of the first unidirectional element is connected to a first terminal of the first switch transistor at a connection point connected to the first terminal of the first capacitor. An input terminal of the first unidirectional element is the first terminal of the first switch branch. A second terminal of the first switch transistor is the second terminal of the first switch branch.

An input terminal of the sixth unidirectional element is connected to a second terminal of the sixth switch transistor at a connection point connected to the second terminal of the second capacitor. An output terminal of the sixth unidirectional element is the first terminal of the sixth switch branch. A first terminal of the sixth switch transistor is the second terminal of the sixth switch branch. Each of the second switch transistor, the third switch transistor, the fourth switch transistor and the fifth switch transistor comprises a body diode or is connected in reverse-parallel to a diode.

Preferably, an output terminal of the first unidirectional element is connected to a first terminal of the first switch transistor at a connection point connected to the first terminal of the first capacitor. A second terminal of the first switch transistor is the first terminal of the first switch branch. An input terminal of the first unidirectional element is the second terminal of the first switch branch.

An input terminal of the sixth unidirectional element is connected to a second terminal of the sixth switch transistor at a connection point connected to the second terminal of the second capacitor. A first terminal of the sixth switch transistor is the first terminal of the sixth switch branch. An output terminal of the sixth unidirectional element is the second terminal of the sixth switch branch. Each of the second switch transistor, the third switch transistor, the fourth switch transistor and the fifth switch transistor comprises a body diode or is connected in reverse-parallel to a diode.

Preferably, the five-level inverter operates in one of the following eight working modes:

a first mode, in which the first switch transistor and the seventh switch transistor are in an on state, and the other switch transistors are in an off state;

a second mode, in which the first switch transistor and the eighth switch transistor are in an on state, and the other switch transistors are in an off state;

a third mode, in which the fourth switch transistor, the fifth switch transistor and the seventh switch transistor are in an on state, and the other switch transistors are in an off state;

a fourth mode, in which the fourth switch transistor, the fifth switch transistor and the eighth switch transistor are in an on state, and the other switch transistors are in an off state;

a fifth mode, in which the second switch transistor, the third switch transistor and the seventh switch transistor are in an on state, and the other switch transistors are in an off state;

a sixth mode, in which the second switch transistor, the third switch transistor and the eighth switch transistor are in an on state, and the other switch transistors are in an off state;

a seventh mode, in which the sixth switch transistor and the seventh switch transistor are in an on state, and the other switch transistors are in an off state; and an eighth mode, in which the sixth switch transistor and the eighth switch transistor are in an on state, and the other switch transistors are in an off state.

Preferably, the five-level inverter operates in one of the following eight working modes:

a first mode, in which the first switch transistor, the second switch transistor and the seventh switch transistor are in an on state, and the other switch transistors are in an off state;

a second mode, in which the first switch transistor, the second switch transistor and the eighth switch transistor are in an on state, and the other switch transistors are in an off state;

a third mode, in which the fourth switch transistor, the fifth switch transistor and the seventh switch transistor are in an on state, and the other switch transistors are in an off state;

a fourth mode, in which the fourth switch transistor, the fifth switch transistor and the eighth switch transistor are in an on state, and the other switch transistors are in an off state;

a fifth mode, in which the second switch transistor, the third switch transistor and the seventh switch transistor are in an on state, and the other switch transistors are in an off state;

a sixth mode, in which the second switch transistor, the third switch transistor and the eighth switch transistor are in an on state, and the other switch transistors are in an off state;

a seventh mode, in which the fifth switch transistor, the sixth switch transistor and the seventh switch transistor are in an on state, and the other switch transistors are in an off state; and an eighth mode, in which the fifth switch transistor, the sixth switch transistor and the eighth switch transistor are in an on state, and the other switch transistors are in an off state.

Preferably, the five-level inverter further includes a ninth switch transistor connected in reverse-parallel to the first unidirectional element and a tenth switch transistor connected in reverse-parallel to the sixth unidirectional element.

Alternatively, the five-level inverter further includes an eleventh switch transistor connected in reverse-parallel to the second unidirectional element and a twelfth switch transistor connected in reverse-parallel to the fifth unidirectional element.

Alternatively, the five-level inverter further includes a thirteenth switch transistor connected in reverse-parallel to the third unidirectional element and a fourteenth switch transistor connected in reverse-parallel to the fourth unidirectional element.

Preferably, the five-level inverter further includes two diodes connected in reverse-parallel to the first switch transistor and the sixth switch transistor respectively. Alternatively, each of the first switch transistor and the sixth switch transistor further includes a body diode.

Preferably, the five-level inverter further includes a fifteenth switch transistor connected in reverse-parallel to the first unidirectional element, a sixteenth switch transistor connected in reverse-parallel to the second unidirectional element, a seventeenth switch transistor connected in reverse-parallel to the fourth unidirectional element and an eighteenth switch transistor connected in reverse-parallel to the fifth unidirectional element.

Preferably, the five-level inverter further includes a nineteenth switch transistor connected in reverse-parallel to the second unidirectional element and a twentieth switch transistor connected in reverse-parallel to the fifth unidirectional element.

Alternatively, the five-level inverter further includes a twenty-first switch transistor connected in reverse-parallel to the third unidirectional element and a twenty-second switch transistor connected in reverse-parallel to the fourth unidirectional element.

Preferably, the five-level inverter further includes a twenty-third switch transistor connected in reverse-parallel to the first unidirectional element and a twenty-fourth switch transistor connected in reverse-parallel to the sixth unidirectional element.

A five-level inverter application circuit includes a first five-level inverter as above and a second five-level inverter as above.

A first input terminal of each of the first five-level inverter and the second five-level inverter is connected to the positive terminal of the direct-current power supply.

A second input terminal of each of the first five-level inverter and the second five-level inverter is connected to a connection point at which the first capacitor is connected to the second capacitor.

A third input terminal of each of the first five-level inverter and the second five-level inverter is connected to the negative terminal of the direct-current power supply.

The output terminal of the first five-level inverter and the output terminal of the second five-level inverter are two alternating-current output terminals of the five-level inverter application circuit.

A five-level inverter application circuit includes a first five-level inverter as above, a second five-level inverter as above and a third five-level inverter as above.

A first input terminal of each of the first five-level inverter, the second five-level inverter and the third five-level inverter is connected to the positive terminal of the direct-current power supply.

A second input terminal of each of the first five-level inverter, the second five-level inverter and the third five-level inverter is connected to a connection point at which the first capacitor is connected to the second capacitor.

A third input terminal of each of the first five-level inverter, the second five-level inverter and the third five-level inverter is connected to the negative terminal of the direct-current power supply.

The output terminal of the first five-level inverter, the output terminal of the second five-level inverter and the output terminal of the third five-level inverter are three alternating-current output terminals of the five-level inverter application circuit.

Preferably, the five-level inverter application circuit further includes a fourth output terminal which is the connection point at which the first capacitor is connected to the second capacitor.

The five-level inverter according to the present disclosure is enabled to output multiple levels of voltage by controlling different conduction combinations of the first switch transistor, the second switch transistor, the third switch transistor, the fourth switch transistor, the fifth switch transistor, the sixth switch transistor, the seventh switch transistor, the eighth switch transistor and the clamping capacitor. Two conduction combinations may be selected for outputting a positive voltage, with currents flowing through the clamping capacitor in opposite directions in the two conduction combinations. Therefore the voltage of the clamping capacitor can be balanced by controlling the two conduction combinations. Similarly, when outputting a negative voltage, the voltage of the clamping capacitor can be balanced by controlling other two conduction combinations. Therefore, a balance of power capacitor voltage can be achieved at full power and full modulation without adding an extra hardware circuit.

BRIEF DESCRIPTION OF THE DRAWINGS

The accompanying drawings needed to be used in the description of the embodiments or the conventional technology are described briefly as follows, so that the technical solutions according to the embodiments in the present disclosure or according to the conventional technology become clearer. It is apparent that the accompanying drawings in the following description are only some embodiments of the present disclosure. For those skilled in the art, other accompanying drawings may be obtained according to these accompanying drawings without any creative work.

DETAILED DESCRIPTION OF EMBODIMENTS

Embodiments in the present disclosure are described in detail as follows with reference to the accompanying drawings, in order to make the above objective, features and advantageous more clear and understandable.

According to the present disclosure, a five-level inverter and an application circuit of the five-level inverter are provided to solve the problem that the inverter in the conventional technology lacks of a function of power capacitor voltage self-balance.

Figure 2:
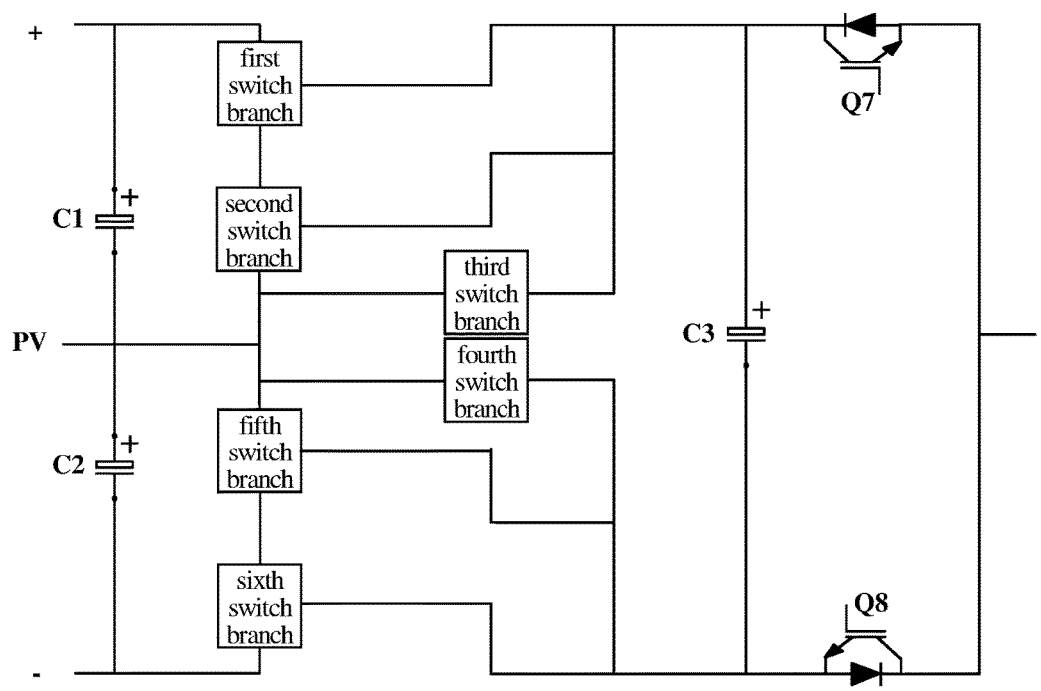
FIG. 2 is a schematic structural diagram of a five-level inverter according to an embodiment in the present disclosure.

Referring to FIG. 2, the five-level inverter is connected between a positive terminal and a negative terminal of a direct-current power supply PV, and is connected in parallel to a branch in which a first capacitor C1 is connected in series to a second capacitor C2.

The five-level inverter includes six switch branches, a seventh switch transistor Q7, an eighth transistor Q8 and a clamping capacitor C3.

A first switch branch of the six switch branches includes a first unidirectional element and a first switch transistor. A common terminal of the first unidirectional element and the first switch transistor is connected to a first terminal of the first capacitor C1.

A second switch branch of the six switch branches includes a second unidirectional element and a second switch transistor. A common terminal of the second unidirectional element and the second switch transistor is connected to a first terminal of the first switch branch.

A third switch branch of the six switch branches includes a third unidirectional element and a third switch transistor. A first terminal of the third switch branch is connected to a first terminal of the second switch branch, a second terminal of the first capacitor C1 and a first terminal of the second capacitor C2.

A fourth switch branch of the six switch branches includes a fourth unidirectional element and a fourth switch transistor. A first terminal of the fourth switch branch is connected to the first terminal of the third switch branch.

A fifth switch branch of the six switch branches includes a fifth unidirectional element and a fifth switch transistor. A first terminal of the fifth switch branch is connected to the first terminal of the fourth switch branch.

A sixth switch branch of the six switch branches includes a sixth unidirectional element and a sixth switch transistor. A first terminal of the sixth switch branch is connected to a common terminal of the fifth unidirectional element and the fifth switch transistor. A common terminal of the sixth unidirectional element and the sixth switch transistor is connected to a second terminal of the second capacitor C2.

A first terminal of the clamping capacitor C3 is connected to a second terminal of the first switch branch, a second terminal of the second switch branch, a second terminal of the third switch branch and a first terminal of the seventh switch transistor Q7. A second terminal of the clamping capacitor C3 is connected to a second terminal of the fourth switch branch, a second terminal of the fifth switch branch, a second terminal of the sixth switch branch and a second terminal of the eighth switch transistor Q8. A first terminal of the eighth switch transistor Q8 is connected to a second terminal of the seventh switch transistor Q7 at a connection point connected to an output terminal of the five-level inverter.

Each of the seventh switch transistor Q7 and the eighth switch transistor Q8 is a switch transistor providing a bidirectional power path.

The five-level inverter according to the embodiment is enabled to output multi-level voltages by controlling different conduction combinations of the first switch transistor, the second switch transistor, the third switch transistor, the fourth switch transistor, the fifth switch transistor, the sixth switch transistor, the seventh switch transistor, the eighth switch transistor and the clamping capacitor C3. Also, two conduction combinations may be selected for outputting a positive voltage, with currents flowing through the clamping capacitor C3 in opposite directions in the two conduction combinations. Therefore the voltage of the clamping capacitor C3 can be balanced by controlling the two conduction combinations. Similarly, when outputting a negative voltage, the voltage of the clamping capacitor C3 can be balanced by controlling other two conduction combinations. The voltages of the first capacitor C1 and the second capacitor C2 are balanced in a same manner as that in a three-level inverter, without leading to the problem of unbalance capacitor voltage in a five-level inverter implemented with diode clamping as in the conventional technology. Therefore, with the five-level inverter provided according to the embodiment, a balance of power capacitor voltage can be achieved at full power and full modulation without adding an extra hardware circuit.

Figure 3:
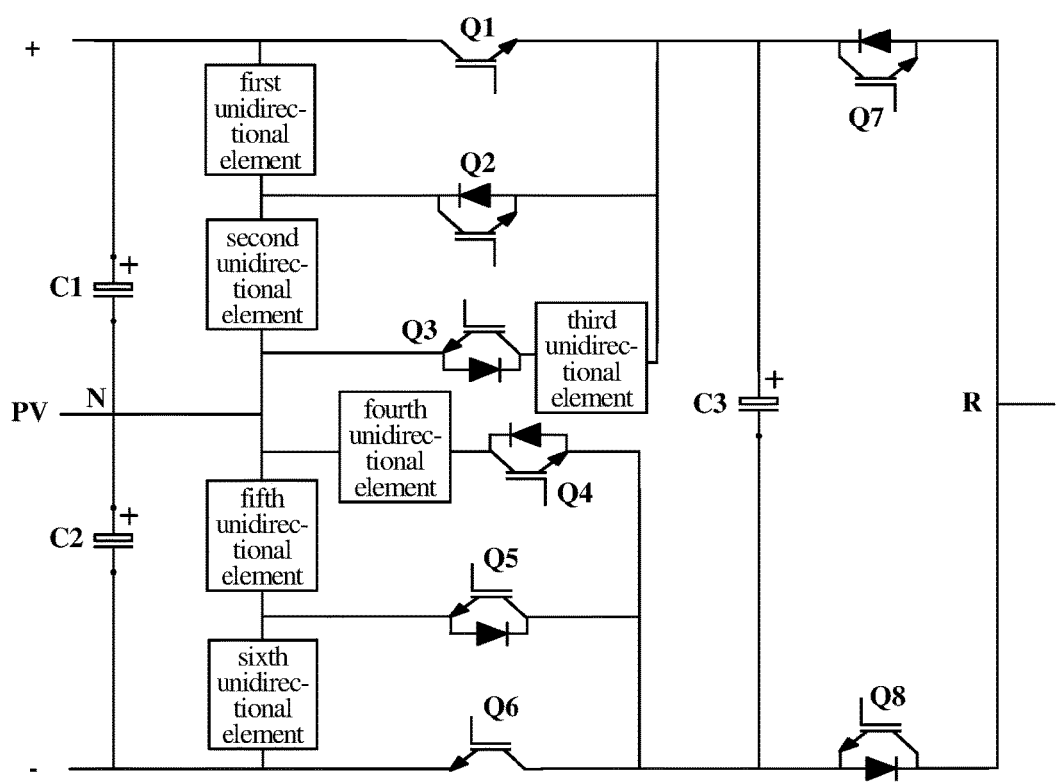
FIG. 3 is a schematic structural diagram of a first type of five-level inverter according to an embodiment in the present disclosure.

Preferably, as shown in FIG. 3, an input terminal of the second unidirectional element is the first terminal of the second switch branch. A second terminal of the second switch transistor Q2 is the second terminal of the second switch branch. The first terminal of the second switch transistor Q2 is connected to the output terminal of the second unidirectional element at a connection point connected to the first terminal of the first switch branch.

A second terminal of the third switch transistor Q3 is the first terminal of the third switch branch. The first terminal of the third switch transistor Q3 is connected to an output terminal of the third unidirectional element. An input terminal of the third unidirectional element is the second terminal of the third switch branch.

An input terminal of the fourth unidirectional element is the first terminal of the fourth switch branch. An output terminal of the fourth unidirectional element is connected to a first terminal of the fourth switch transistor Q4. A second terminal of the fourth switch transistor Q4 is the second terminal of the fourth switch branch.

An output terminal of the fifth unidirectional element is connected to a second terminal of the fifth switch transistor Q5 at a connection point connected to the first terminal of the sixth switch branch. An input terminal of the fifth unidirectional element is the first terminal of the fifth switch branch. A first terminal of the fifth switch transistor Q5 is the second terminal of the fifth switch branch.

Each of the second switch transistor Q2, the third switch transistor Q3, the fourth switch transistor Q4 and the fifth switch transistor Q5 includes a body diode or is connected in reverse-parallel to a diode.

In a specific application, each of the seventh switch transistor Q7 and the eighth switch transistor Q8 preferably includes a body diode or is connected in reverse-parallel to a diode, as shown in FIG. 3.

Furthermore, as shown in FIG. 3, an output terminal of the first unidirectional element is connected to a first terminal of the first switch transistor Q1 at a connection point connected to the first terminal of the first capacitor C1. An input terminal of the first unidirectional element is the first terminal of the first switch branch. A second terminal of the first switch transistor Q1 is the second terminal of the first switch branch.

An input terminal of the sixth unidirectional element is connected to a second terminal of the sixth switch transistor Q6 at a connection point connected to the second terminal of the second capacitor C2. An output terminal of the sixth unidirectional element is the first terminal of the sixth switch branch. A first terminal of the sixth switch transistor Q6 is the second terminal of the sixth switch branch.

FIG. 3 shows a specific implementation of a first type of five-level inverter according to the present disclosure. A voltage between the positive terminal and the negative terminal of the direct-current power supply PV has a value of Udc. Voltages of the first capacitor C1 and the second capacitor C2 each have a value of Udc/2. A voltage of the clamping capacitor C3 has a value of Udc/4. A voltage between the node R and the node N is the output voltage $V_{RN}$ of the five-level inverter. The five-level inverter operates in one of the following eight working modes.

In a first mode, the first switch transistor Q1 and the seventh switch transistor Q7 are in an on state, and the other switch transistors are in an off state.

In the first mode, an active current path is from the positive terminal of the direct-current power supply PV to the first switch transistor Q1, then to the seventh switch transistor Q7, and then to the node R, with the output voltage $V_{RN}$ having a value of Udc/2. For an reactive output, an reactive current path is correspondingly from the node R to the diode connected in reverse-parallel to the seventh switch transistor Q7 or the body diode of the seventh switch transistor Q7, then to the diode connected in reverse-parallel to the second switch transistor Q2 or the body diode of the second switch transistor Q2, then to the first unidirectional element, then to the positive terminal of the direct-current power supply PV, then to the first capacitor C1, and then to the node N, with the output voltage $V_{RN}$ having a value of Udc/2.

In a second mode, the first switch transistor Q1 and the eighth switch transistor Q8 are in an on state, and the other switch transistors are in an off state.

In the second mode, an active current path is from the positive terminal of the direct-current power supply PV to the first switch transistor Q1, then to the clamping capacitor C3, then to the diode connected in reverse-parallel to the eighth switch transistor Q8 or the body diode of the eighth switch transistor Q8, and then to the node R, with the output voltage $V_{RN}$ having a value of Udc/4. For an reactive output, an reactive current path is correspondingly from the node R to the eighth switch transistor Q8, then to the clamping capacitor C3, then to the diode connected in reverse-parallel to the second switch transistor Q2 or the body diode of the second switch transistor Q2, then to the first unidirectional element, then to the positive terminal of the direct-current power supply PV, then to the first capacitor C1, and then to the node N, with the output voltage $V_{RN}$ having a value of Udc/4.

In a third mode, the fourth switch transistor Q4, the fifth switch transistor Q5 and the seventh switch transistor Q7 are in an on state, and the other switch transistors are in an off state.

In the third mode, an active current path is from the node N to the fourth unidirectional element, then to the fourth switch transistor Q4, then to the clamping capacitor C3, then to the seventh switch transistor Q7, and then to the node R, with the output voltage $V_{RN}$ having a value of Udc/4. For an reactive output, an reactive current path is correspondingly from the node R to the diode connected in reverse-parallel to the seventh switch transistor Q7 or the body diode of the seventh switch transistor Q7, then to the clamping capacitor C3, then to the fifth switch transistor Q5, then to the fifth unidirectional element, and then to the node N, with the output voltage $V_{RN}$ having a value of Udc/4.

In a fourth mode, the fourth switch transistor Q4, the fifth switch transistor Q5 and the eighth switch transistor Q8 are in an on state, and the other switch transistors are in an off state.

In the fourth mode, an active current path is from the node N to the fourth unidirectional element, then to the fourth switch transistor Q4, then to the diode connected in reverse-parallel to the eighth switch transistor Q8 or the body diode of the eighth switch transistor Q8, and then to the node R, with the output voltage $V_{RN}$ having a value of 0. For an reactive output, an reactive current path is correspondingly from the node R to the eighth switch transistor Q8, then to the fifth switch transistor Q5, then to the fifth unidirectional element, and then to the node N, with the output voltage $V_{RN}$ having a value of 0.

In a fifth mode, the second switch transistor Q2, the third switch transistor Q3 and the seventh switch transistor Q7 are in an on state, and the other switch transistors are in an off state.

In the fifth mode, an active current path is from the node R to the diode connected in reverse-parallel to the seventh switch transistor Q7 or the body diode of the seventh switch transistor Q7, then to the third unidirectional element, then to the third switch transistor Q3, and then to the node N, with the output voltage $V_{RN}$ having a value of 0. For an reactive output, an reactive current path is correspondingly from the node N to the second unidirectional element, then to the second switch transistor Q2, then to the seventh switch transistor Q7, and then to the node R, with the output voltage $V_{RN}$ having a value of 0.

In a sixth mode, the second switch transistor Q2, the third switch transistor Q3 and the eighth switch transistor Q8 are in an on state, and the other switch transistors are in an off state.

In the sixth mode, an active current path is from the node R to the eighth switch transistor Q8, then to the clamping capacitor C3, then to the third unidirectional element, then to the third switch transistor Q3, and then to the node N, with the output voltage $V_{RN}$ having a value of −Udc/4. For an reactive output, an reactive current path is correspondingly from the node N to the second unidirectional element, then to the second switch transistor Q2, then to the clamping capacitor C3, then to the diode connected in reverse-parallel to the eighth switch transistor Q8 or the body diode of the eighth switch transistor Q8, and then to the node R, with the output voltage $V_{RN}$ having a value of −Udc/4.

In a seventh mode, the sixth switch transistor Q6 and the seventh switch transistor Q7 are in an on state, and the other switch transistors are in an off state.

In the seventh mode, an active current path is from the node R to the diode connected in reverse-parallel to the seventh switch transistor Q7 or the body diode of the seventh switch transistor Q7, then to the clamping capacitor C3, then to the sixth switch transistor Q6, then to the negative terminal of the direct-current power supply PV, then to the second capacitor C2, and then to the node N, with the output voltage $V_{RN}$ having a value of −Udc/4. For an reactive output, an reactive current path is correspondingly from the node N to the second capacitor C2, then to the negative terminal of the direct-current power supply PV, then to the sixth unidirectional element, then to the diode connected in reverse-parallel to the fifth switch transistor Q5 or the body diode of the fifth switch transistor Q5, then to the clamping capacitor C3, then to the seventh switch transistor Q7, and then to the node R, with the output voltage $V_{RN}$ having a value of −Udc/4.

In an eighth mode, the sixth switch transistor Q6 and the eighth switch transistor Q8 are in an on state, and the other switch transistors are in an off state.

In the eighth mode, an active current path is from the node R to the eighth switch transistor Q8, then to the sixth switch transistor Q6, then to the negative terminal of the direct-current power supply PV, then to the second capacitor C2, and then to the node N, with the output voltage $V_{RN}$ having a value of −Udc/2. For an reactive output, an reactive current path is correspondingly from the node N to the second capacitor C2, then to the negative terminal of the direct-current power supply PV, then to the sixth unidirectional element, then to the diode connected in reverse-parallel to the fifth switch transistor Q5 or the body diode of the fifth switch transistor Q5, then to the diode connected in reverse-parallel to the eighth switch transistor Q8 or the body diode of the eighth switch transistor Q8, and then to the node R, with the output voltage $V_{RN}$ having a value of −Udc/2.

Figure 4:
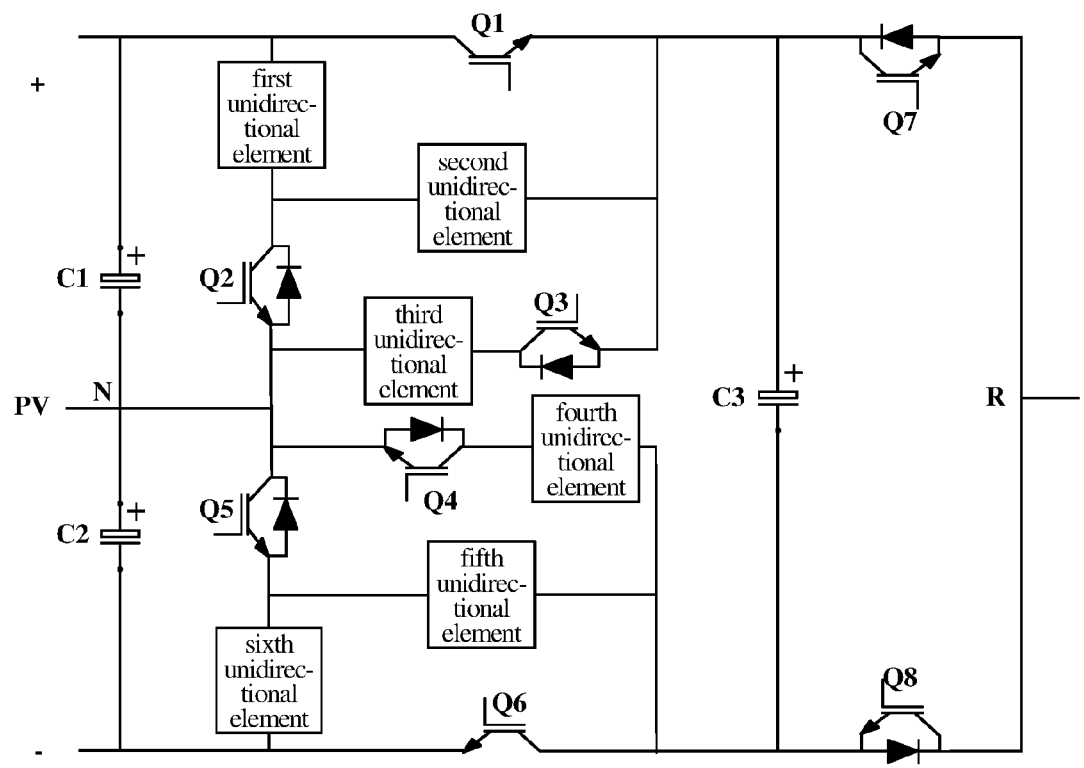
FIG. 4 is a schematic structural diagram of a second type of five-level inverter according to an embodiment in the present disclosure.

Alternatively, as shown in FIG. 4, a second terminal of the second switch transistor Q2 is the first terminal of the second switch branch. An input terminal of the second unidirectional element is the second terminal of the second switch branch. A first terminal of the second switch transistor Q2 is connected to an output terminal of the second unidirectional element at a connection point connected to the first terminal of the first switch branch.

An input terminal of the third unidirectional element is the first terminal of the third switch branch. An output terminal of the third unidirectional element is connected to a first terminal of the third switch transistor Q3. A second terminal of the third switch transistor Q3 is the second terminal of the third switch branch.

A second terminal of the fourth switch transistor Q4 is the first terminal of the fourth switch branch. A first terminal of the fourth switch transistor Q4 is connected to an output terminal of the fourth unidirectional element. An input terminal of the fourth unidirectional element is the second terminal of the fourth switch branch.

A second terminal of the fifth switch transistor Q5 is connected to an input terminal of the third unidirectional element at a connection point connected to the first terminal of the sixth switch branch. A first terminal of the fifth switch transistor Q5 is the first terminal of the fifth switch branch. An output terminal of the fifth unidirectional element is the second terminal of the fifth switch branch.

Furthermore, an output terminal of the first unidirectional element is connected to a first terminal of the first switch transistor Q1 at a connection point connected to the first terminal of the first capacitor C1. An input terminal of the first unidirectional element is the first terminal of the first switch branch. A second terminal of the first switch transistor Q1 is the second terminal of the first switch branch.

An input terminal of the sixth unidirectional element is connected to a second terminal of the sixth switch transistor Q6 at a connection point connected to the second terminal of the second capacitor C2. An output terminal of the sixth unidirectional element is the first terminal of the sixth switch branch. A first terminal of the sixth switch transistor Q6 is the second terminal of the sixth switch branch.

In a specific application, preferably each of the second switch transistor Q2, the third switch transistor Q3, the fourth switch transistor Q4, the fifth switch transistor Q5, the seventh switch transistor Q7 and the eighth switch transistor Q8 includes a body diode or is connected in reverse-parallel to a diode, as shown in FIG. 4.

FIG. 4 shows a specific implementation of a second type of five-level inverter according to the present disclosure.

In the second type of five-level inverter as shown in FIG. 4, a voltage between the positive terminal and the negative terminal of the direct-current power supply PV has a value of Udc. Voltages of the first capacitor C1 and the second capacitor C2 each have a value of Udc/2. A voltage of the clamping capacitor C3 has a value of Udc/4. A voltage between the node R and the node N is the output voltage $V_{RN}$ of the five-level inverter. The five-level inverter operates in one of the following eight working modes.

In a first mode, the first switch transistor Q1 and the seventh switch transistor Q7 are in an on state, and the other switch transistors are in an off state.

In the first mode, an active current path is from the positive terminal of the direct-current power supply PV to the first switch transistor Q1, then to the seventh switch transistor Q7, and then to the node R, with the output voltage $V_{RN}$ having a value of Udc/2. For an reactive output, an reactive current path is correspondingly from the node R to the diode connected in reverse-parallel to the seventh switch transistor Q7 or the body diode of the seventh switch transistor Q7, then to the second unidirectional element, then to the first unidirectional element, then to the positive terminal of the direct-current power supply PV, then to the first capacitor C1, and then to the node N, with the output voltage $V_{RN}$ having a value of Udc/2.

In a second mode, the first switch transistor Q1 and the eighth switch transistor Q8 are in an on state, and the other switch transistors are in an off state.

In the second mode, an active current path is from the positive terminal of the direct-current power supply PV to the first switch transistor Q1, then to the clamping capacitor C3, then to the diode connected in reverse-parallel to the eighth switch transistor Q8 or the body diode of the eighth switch transistor Q8, and then to the node R, with the output voltage $V_{RN}$ having a value of Udc/4. For an reactive output, an reactive current path is correspondingly from the node R to the eighth switch transistor Q8, then to the clamping capacitor C3, then to the second unidirectional element, then to the first unidirectional element, then to the positive terminal of the direct-current power supply PV, then to the first capacitor C1, and then to the node N, with the output voltage $V_{RN}$ having a value of Udc/4.

In a third mode, the fourth switch transistor Q4, the fifth switch transistor Q5 and the seventh switch transistor Q7 are in an on state, and the other switch transistors are in an off state.

In the third mode, an active current path is from the node N to the fifth switch transistor Q5, then to the fifth unidirectional element, then to the clamping capacitor C3, then to the seventh switch transistor Q7, and then to the node R, with the output voltage $V_{RN}$ having a value of Udc/4. For an reactive output, an reactive current path is correspondingly from the node R to the diode connected in reverse-parallel to the seventh switch transistor Q7 or the body diode of the seventh switch transistor Q7, then to the clamping capacitor C3, then to the fourth unidirectional element, then to the fourth switch transistor Q4, and then to the node N, with the output voltage $V_{RN}$ having a value of Udc/4.

In a fourth mode, the fourth switch transistor Q4, the fifth switch transistor Q5 and the eighth switch transistor Q8 are in an on state, and the other switch transistors are in an off state.

In the fourth mode, an active current path is from the node N to the fifth switch transistor Q5, then to the fifth unidirectional element, then to the diode connected in reverse-parallel to the eighth switch transistor Q8 or the body diode of the eighth switch transistor Q8, and then to the node R, with the output voltage $V_{RN}$ having a value of 0. For an reactive output, an reactive current path is correspondingly from the node R to the eighth switch transistor Q8, then to the fourth unidirectional element, then to the fourth switch transistor Q4, and then to the node N, with the output voltage $V_{RN}$ having a value of 0.

In a fifth mode, the second switch transistor Q2, the third switch transistor Q3 and the seventh switch transistor Q7 are in an on state, and the other switch transistors are in an off state.

In the fifth mode, an active current path is from the node R to the diode connected in reverse-parallel to the seventh switch transistor Q7 or the body diode of the seventh switch transistor Q7, then to the second unidirectional element, then to the second switch transistor Q2, and then to the node N, with the output voltage $V_{RN}$ having a value of 0. For an reactive output, an reactive current path is correspondingly from the node N to the third unidirectional element, then to the third switch transistor Q3, then to the seventh switch transistor Q7, and then to the node R, with the output voltage $V_{RN}$ having a value of 0.

In a sixth mode, the second switch transistor Q2, the third switch transistor Q3 and the eighth switch transistor Q8 are in an on state, and the other switch transistors are in an off state.

In the sixth mode, an active current path is from the node R to the eighth switch transistor Q8, then to the clamping capacitor C3, then to the second unidirectional element, then to the second switch transistor Q2, and then to the node N, with the output voltage $V_{RN}$ having a value of −Udc/4. For an reactive output, an reactive current path is correspondingly from the node N to the third unidirectional element, then to the third switch transistor Q3, then to the clamping capacitor C3, then to the diode connected in reverse-parallel to the eighth switch transistor Q8 or the body diode of the eighth switch transistor Q8, and then to the node R, with the output voltage $V_{RN}$ having a value of −Udc/4.

In a seventh mode, the sixth switch transistor Q6 and the seventh switch transistor Q7 are in an on state, and the other switch transistors are in an off state.

In the seventh mode, an active current path is from the node R to the diode connected in reverse-parallel to the seventh switch transistor Q7 or the body diode of the seventh switch transistor Q7, then to the clamping capacitor C3, then to the sixth switch transistor Q6, then to the negative terminal of the direct-current power supply PV, then to the second capacitor C2, and then to the node N, with the output voltage $V_{RN}$ having a value of −Udc/4. For an reactive output, an reactive current path is correspondingly from the node N to the second capacitor C2, then to the negative terminal of the direct-current power supply PV, then to the sixth unidirectional element, then to the fifth unidirectional element, then to the clamping capacitor C3, then to the seventh switch transistor Q7, and then to the node R, with the output voltage $V_{RN}$ having a value of −Udc/4.

In an eighth mode, the sixth switch transistor Q6 and the eighth switch transistor Q8 are in an on state, and the other switch transistors are in an off state.

In the eighth mode, an active current path is from the node R to the eighth switch transistor Q8, then to the sixth switch transistor Q6, then to the negative terminal of the direct-current power supply PV, then to the second capacitor C2, and then to the node N, with the output voltage $V_{RN}$ having a value of −Udc/2. For an reactive output, an reactive current path is correspondingly from the node N to the second capacitor C2, then to the negative terminal of the direct-current power supply PV, then to the sixth unidirectional element, then to the fifth unidirectional element, then to the diode connected in reverse-parallel to the eighth switch transistor Q8 or the body diode of the eighth switch transistor Q8, and then to the node R, with the output voltage $V_{RN}$ having a value of −Udc/2.

Figure 5:
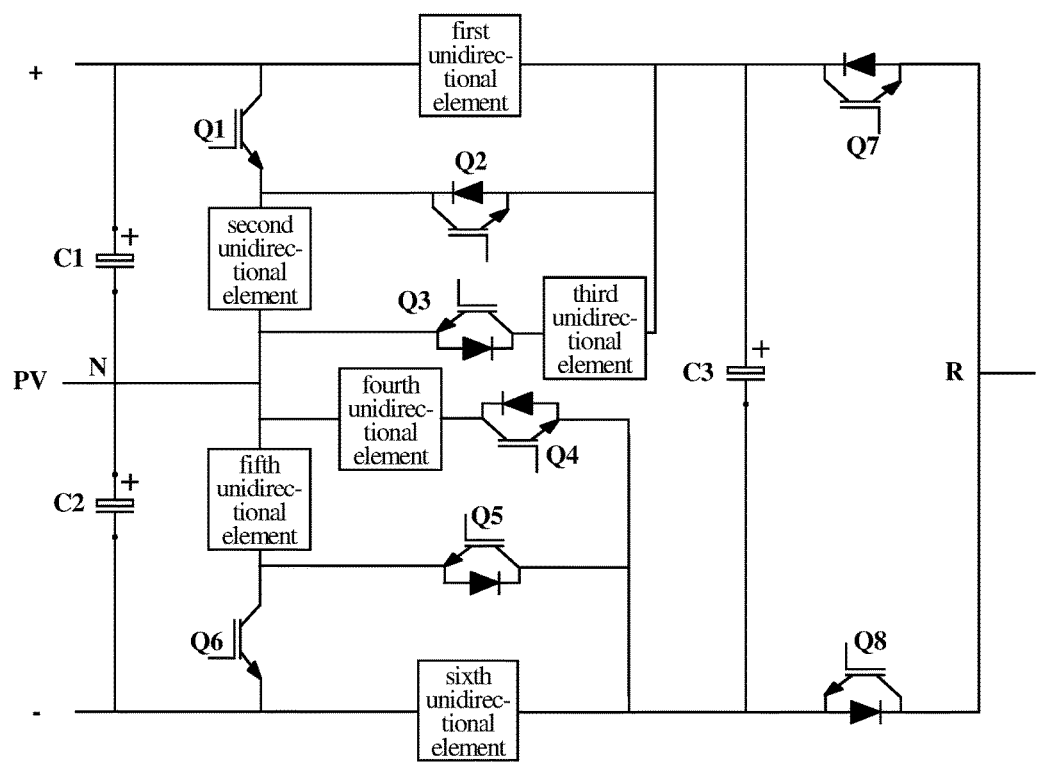
FIG. 5 is a schematic structural diagram of a third type of five-level inverter according to an embodiment in the present disclosure.

Alternatively, as shown in FIG. 5, an input terminal of the second unidirectional element is the first terminal of the second switch branch. A second terminal of the second switch transistor Q2 is the second terminal of the second switch branch. A first terminal of the second switch transistor Q2 is connected to an output terminal of the second unidirectional element at a connection point connected to the first terminal of the first switch branch.

A second terminal of the third switch transistor Q3 is the first terminal of the third switch branch. A first terminal of the third switch transistor Q3 is connected to an output terminal of the third unidirectional element. An input terminal of the third unidirectional element is the second terminal of the third switch branch.

An input terminal of the fourth unidirectional element is the first terminal of the fourth switch branch. An output terminal of the fourth unidirectional element is connected to a first terminal of the fourth switch transistor Q4. A second terminal of the fourth switch transistor Q4 is the second terminal of the fourth switch branch.

An output terminal of the fifth unidirectional element is connected to a second terminal of the fifth switch transistor Q5 at a connection point connected to the first terminal of the sixth switch branch. An input terminal of the fifth unidirectional element is the first terminal of the fifth switch branch. A first terminal of the fifth switch transistor Q5 is the second terminal of the fifth switch branch.

An output terminal of the first unidirectional element is connected to a first terminal of the first switch transistor Q1 at a connection point connected to the first terminal of the first capacitor C1. A second terminal of the first switch transistor Q1 is the first terminal of the first switch branch.

An input terminal of the first unidirectional element is the second terminal of the first switch branch.

An input terminal of the sixth unidirectional element is connected to a second terminal of the sixth switch transistor Q6 at a connection point connected to the second terminal of the second capacitor C2. A first terminal of the sixth switch transistor Q6 is the first terminal of the sixth switch branch. An output terminal of the sixth unidirectional element is the second terminal of the sixth switch branch.

In an specific application, preferably each of the second switch transistor Q2, the third switch transistor Q3, the fourth switch transistor Q4, the fifth switch transistor Q5, the seventh switch transistor Q7 and the eighth switch transistor Q8 includes a body diode or is connected in reverse-parallel to a diode, as shown in FIG. 5.

FIG. 5 shows a specific implementation of a third type of five-level inverter according to the present disclosure. A voltage between the positive terminal and the negative terminal of the direct-current power supply PV has a value of Udc. Voltages of the first capacitor C1 and the second capacitor C2 each have a value of Udc/2. A voltage of the clamping capacitor C3 has a value of Udc/4. A voltage between the node R and the node N is the output voltage $V_{RN}$ of the five-level inverter. The five-level inverter operates in one of the following eight working modes.

In a first mode, the first switch transistor Q1, the second switch transistor Q2 and the seventh switch transistor Q7 are in an on state, and the other switch transistors are in an off state.

In the first mode, an active current path is from the positive terminal of the direct-current power supply PV to the first switch transistor Q1, then to the second switch transistor Q2, then to the seventh switch transistor Q7, and then to the node R, with the output voltage $V_{RN}$ having a value of Udc/2. For an reactive output, an reactive current path is correspondingly from the node R to the diode connected in reverse-parallel to the seventh switch transistor Q7 or the body diode of the seventh switch transistor Q7, then to the first unidirectional element, then to the positive terminal of the direct-current power supply PV, then to the first capacitor C1, and then to the node N, with the output voltage $V_{RN}$ having a value of Udc/2.

In a second mode, the first switch transistor Q1, the second switch transistor Q2 and the eighth switch transistor Q8 are in an on state, and the other switch transistors are in an off state.

In the second mode, an active current path is from the positive terminal of the direct-current power supply PV to the first switch transistor Q1, then to the second switch transistor Q2, then to the clamping capacitor C3, then to the diode connected in reverse-parallel to the eighth switch transistor Q8 or the body diode of the eighth switch transistor Q8, and then to the node R, with the output voltage $V_{RN}$ having a value of Udc/4. For an reactive output, an reactive current path is correspondingly from the node R to the eighth switch transistor Q8, then to the clamping capacitor C3, then to the first unidirectional element, then to the positive terminal of the direct-current power supply PV, then to the first capacitor C1, and then to the node N, with the output voltage $V_{RN}$ having a value of Udc/4.

In a third mode, the fourth switch transistor Q4, the fifth switch transistor Q5 and the seventh switch transistor Q7 are in an on state, and the other switch transistors are in an off state.

In the third mode, an active current path is from the node N to the fourth unidirectional element, then to the fourth switch transistor Q4, then to the clamping capacitor C3, then to the seventh switch transistor Q7, and then to the node R, with the output voltage $V_{RN}$ having a value of Udc/4. For an reactive output, an reactive current path is correspondingly from the node R to the diode connected in reverse-parallel to the seventh switch transistor Q7 or the body diode of the seventh switch transistor Q7, then to the clamping capacitor C3, then to the fifth switch transistor Q5, then to the fifth unidirectional element, and then to the node N, with the output voltage $V_{RN}$ having a value of Udc/4.

In a fourth mode, the fourth switch transistor Q4, the fifth switch transistor Q5 and the eighth switch transistor Q8 are in an on state, and the other switch transistors are in an off state.

In the fourth mode, an active current path is from the node N to the fourth unidirectional element, then to the fourth switch transistor Q4, then to the diode connected in reverse-parallel to the eighth switch transistor Q8 or the body diode of the eighth switch transistor Q8, and then to the node R, with the output voltage $V_{RN}$ having a value of 0. For an reactive output, an reactive current path is correspondingly from the node R to the eighth switch transistor Q8, then to the fifth switch transistor Q5, then to the fifth unidirectional element, and then to the node N, with the output voltage $V_{RN}$ having a value of 0.

In a fifth mode, the second switch transistor Q2, the third switch transistor Q3 and the seventh switch transistor Q7 are in an on state, and the other switch transistors are in an off state.

In the fifth mode, an active current path is from the node R to the diode connected in reverse-parallel to the seventh switch transistor Q7 or the body diode of the seventh switch transistor Q7, then to the third switch transistor Q3, then to the third unidirectional element, and then to the node N, with the output voltage $V_{RN}$ having a value of 0. For an reactive output, an reactive current path is correspondingly from the node N to the second unidirectional element, then to the second switch transistor Q2, then to the seventh switch transistor Q7, and then to the node R, with the output voltage $V_{RN}$ having a value of 0.

In a sixth mode, the second switch transistor Q2, the third switch transistor Q3 and the eighth switch transistor Q8 are in an on state, and the other switch transistors are in an off state.

In the sixth mode, an active current path is from the node R to the eighth switch transistor Q8, then to the clamping capacitor C3, then to the third switch transistor Q3, then to the third unidirectional element, and then to the node N, with the output voltage $V_{RN}$ having a value of –Udc/4. For an reactive output, an reactive current path is correspondingly from the node N to the second unidirectional element, then to the second switch transistor Q2, then to the clamping capacitor C3, then to the diode connected in reverse-parallel to the eighth switch transistor Q8 or the body diode of the eighth switch transistor Q8, and then to the node R, with the output voltage $V_{RN}$ having a value of –Udc/4.

In a seventh mode, the fifth switch transistor Q5, the sixth switch transistor Q6 and the seventh switch transistor Q7 are in an on state, and the other switch transistors are in an off state.

In the seventh mode, an active current path is from the node R to the diode connected in reverse-parallel to the seventh switch transistor Q7 or the body diode of the seventh switch transistor Q7, then to the clamping capacitor C3, then to the fifth switch transistor Q5, then to the sixth switch transistor Q6, then to the negative terminal of the direct-current power supply PV, then to the second capacitor C2, and then to the node N, with the output voltage $V_{RN}$ having a value of −Udc/4. For an reactive output, an reactive current path is correspondingly from the node N to the second capacitor C2, then to the negative terminal of the direct-current power supply PV, then to the sixth unidirectional element, then to the clamping capacitor C3, then to the seventh switch transistor Q7, and then to the node R, with the output voltage $V_{RN}$ having a value of −Udc/4.

In an eighth mode, the fifth switch transistor Q5, the sixth switch transistor Q6 and the eighth switch transistor Q8 are in an on state, and the other switch transistors are in an off state.

In the eighth mode, an active current path is from the node R to the eighth switch transistor Q8, then to the fifth switch transistor Q5, then to the sixth switch transistor Q6, then to the negative terminal of the direct-current power supply PV, then to the second capacitor C2, and then to the node N, with the output voltage $V_{RN}$ having a value of −Udc/2. For an reactive output, an reactive current path is correspondingly from the node N to the second capacitor C2, then to the negative terminal of the direct-current power supply PV, then to the sixth unidirectional element, then to the diode connected in reverse-parallel to the eighth switch transistor Q8 or the body diode of the eighth switch transistor Q8, and then to the node R, with the output voltage $V_{RN}$ having a value of −Udc/2.

It follows from the above embodiments that, two working modes, namely the second mode and the third mode can be selected for outputting a positive voltage, with currents flowing through the clamping capacitor C3 in opposite directions in the two working modes. Therefore the voltage of the clamping capacitor C3 can be balanced by flexibly selecting the two working modes. Similarly, when outputting a negative voltage, the voltage of the clamping capacitor C3 can be balanced by flexibly selecting other two working modes, namely the sixth mode and the seventh mode. A balance of capacitor voltage can be achieved at full power and full modulation without adding an extra hardware circuit.

Figure 1:
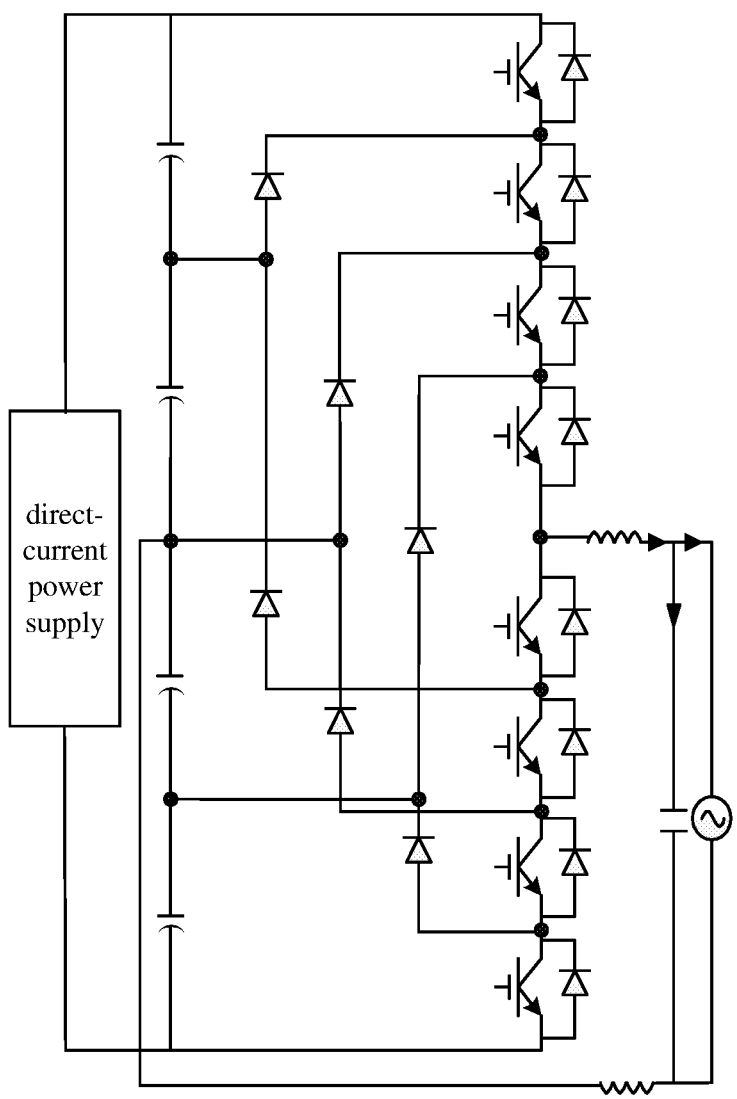
FIG. 1 is a schematic structural diagram of a five-level inverter according to the conventional technology.

It should be noted that, the five-level inverter in the conventional technology as shown in FIG. 1 includes more current commutation paths and each of the current paths includes multiple switch transistors, resulting in a low efficiency.

However, the first type of five-level inverter, the second type of five-level inverter and the third type of five-level inverter according to the above embodiments each have two switch transistors in an on state in some of respective eight working modes, improving the efficiency of the system.

Furthermore, in an application of non-unity power factor, internal diodes of the switch transistors of the multi-level inverter as shown in FIG. 1 need to provide current path. Therefore, in a case that both the application of unity power factor and the application of non-unity power factor are needed, the performance of the switch transistors and that of the internal diodes both should be considered, bringing difficulties to the selection of elements. In many cases, an external diode may need to be connected in reverse-parallel in order to meet specific application requirements. Moreover, the switch transistors need to operate in both the application of unity power factor and the application of non-unity power factor, thereby resulting in an over loss, reducing the service life of the elements due to the limited switching frequency, and decreasing the overall conversion efficiency of the circuit.

However, with the five-level inverter according to the above embodiments, five levels can be outputted, the content of current harmonic wave of the system can be decreased, the alternating-current filtering inductance of the system can be reduced, the voltage class of the system can be increased, and a common-mode voltage of the system can be dropped. Furthermore, a balance of power capacitor voltage can be achieved at full power and full modulation without adding an extra hardware circuit. In addition, in the case that both the application of unity power factor and the application of non-unity power factor are needed, the switch element can be selected in a large range, and the loss of switch transistors is further reduced, thereby prolonging the service life of the elements, improving the overall conversion efficiency of the circuit and greatly reducing the loss of switch transistors.

In addition, in the above working modes, the selection of the switch transistors and the source of the driving signal are not limited herein and can be determined depending on practical conditions.

In a practical application, the five-level inverter is not limited to the implementation as shown in FIG. 3, FIG. 4 or FIG. 5. In a case that the first switch branch, the second switch branch and the third switch branch of the five-level inverter are in the form as shown in FIG. 3, the fourth switch branch, the fifth switch branch and the sixth switch branch of the five-level inverter are not limited to the implementation as shown in FIG. 3 but may be in the form as shown in FIG. 4 or FIG. 5. In a case that the first switch branch, the second switch branch and the third switch branch of the five-level inverter are in the form as shown in FIG. 4, the fourth switch branch, the fifth switch branch and the sixth switch branch of the five-level inverter are not limited to the implementation as shown in FIG. 4 but may be in the form as shown in FIG. 3 or FIG. 5. In a case that the first switch branch, the second switch branch and the third switch branch of the five-level inverter are in the form as shown in FIG. 5, the fourth switch branch, the fifth switch branch and the sixth switch branch of the five-level inverter are not limited to the implementation as shown in FIG. 5 but may be in the form as shown in FIG. 3 or FIG. 4. The above implementations are all fall within the protection scope of the present disclosure, and are not described in detail herein.

Figure 6:
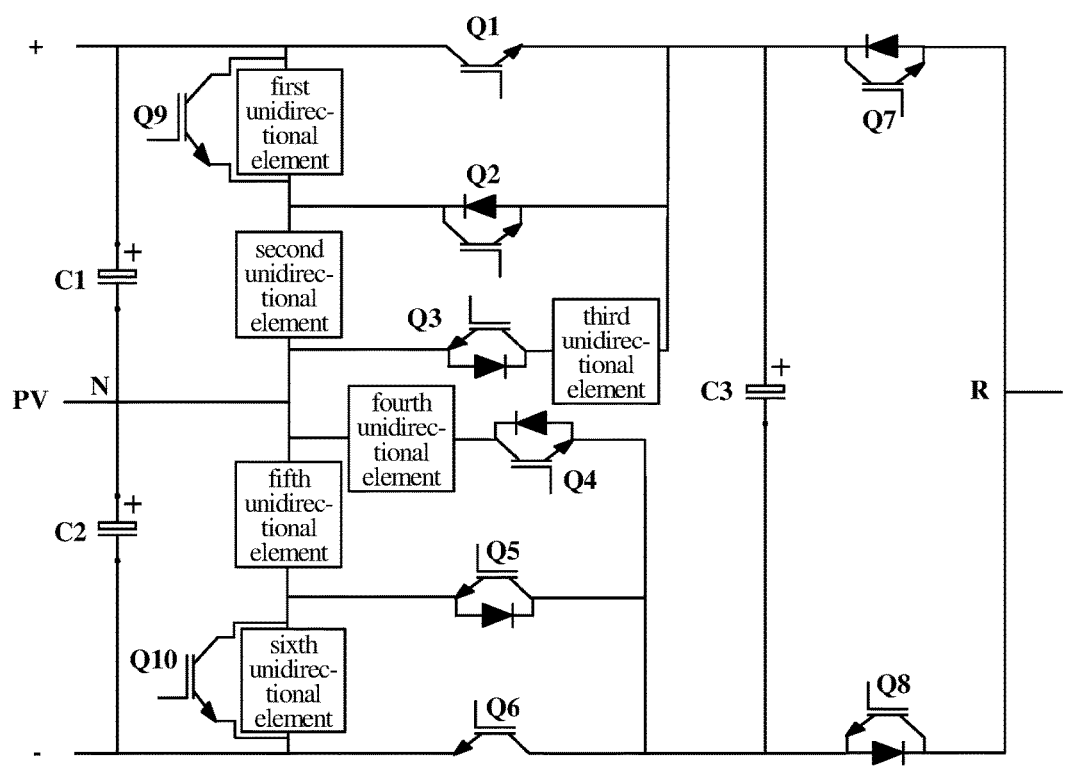
FIG. 6 is a schematic structural diagram of a five-level inverter according to another embodiment in the present disclosure.

Preferably, on the basis of the implementation as shown in FIG. 3, the five-level inverter further includes a ninth switch transistor Q9 connected in reverse-parallel to the first unidirectional element and a tenth switch transistor Q10 connected in reverse-parallel to the sixth unidirectional element, as shown in FIG. 6.

In this case, among the eight working modes of the five-level inverter, the third mode, the fourth mode, the fifth mode and the sixth mode of the five-level inverter are the same as those of the first type of five-level inverter as shown in FIG. 3, while the first mode, the second mode, the seventh mode and the eighth mode of the five-level inverter change accordingly as follows.

In the first mode, the first switch transistor Q1, the second switch transistor Q2, the seventh switch transistor Q7 and the ninth switch transistor Q9 are in an on state, and the other switch transistors are in an off state.

In the first mode, two active current paths exist, one is from the positive terminal of the direct-current power supply PV to the first switch transistor Q1, then to the seventh switch transistor Q7, and then to the node R, and the other one is from the positive terminal of the direct-current power supply PV to the ninth switch transistor Q9, then to the second switch transistor Q2, then to the seventh switch transistor Q7, and then to the node R, with the output voltage $V_{RN}$ having a value of Udc/2. For an reactive output, an reactive current path is correspondingly from the node R to the diode connected in reverse-parallel to the seventh switch transistor Q7 or the body diode of the seventh switch transistor Q7, then to the diode connected in reverse-parallel to the second switch transistor Q2 or the body diode of the second switch transistor Q2, then to the first unidirectional element, then to the positive terminal of the direct-current power supply PV, then to the first capacitor C1, and then to the node N, with the output voltage $V_{RN}$ having a value of Udc/2.

In the second mode, the first switch transistor Q1, the second switch transistor Q2, the eighth switch transistor Q8 and the ninth switch transistor Q9 are in an on state, and the other switch transistors are in an off state.

In the second mode, two active current paths exist, one is from the positive terminal of the direct-current power supply PV to the first switch transistor Q1, then to the clamping capacitor C3, then to the diode connected in reverse-parallel to the eighth switch transistor Q8 or the body diode of the eighth switch transistor Q8, and then to the node R, the other one is from the positive terminal of the direct-current power supply PV to the ninth switch transistor Q9, and then to the second switch transistor Q2, then to the clamping capacitor C3, then to the diode connected in reverse-parallel to the eighth switch transistor Q8 or the body diode of the eighth switch transistor Q8, and then to the node R, with the output voltage $V_{RN}$ having a value of Udc/4. For an reactive output, an reactive current path is correspondingly from the node R to the eighth switch transistor Q8, then to the clamping capacitor C3, then to the diode connected in reverse-parallel to the second switch transistor Q2 or the body diode of the second switch transistor Q2, then to the first unidirectional element, then to the positive terminal of the direct-current power supply PV, then to the first capacitor C1, and then to the node N, with the output voltage $V_{RN}$ having a value of Udc/4.

In the seventh mode, the fifth switch transistor Q5, the sixth switch transistor Q6, the seventh switch transistor Q7 and the tenth switch transistor Q10 are in an on state, and the other switch transistors are in an off state.

In the seventh mode, two active current paths exist, one is from the node R to the diode connected in reverse-parallel to the seventh switch transistor Q7 or the body diode of the seventh switch transistor Q7, then to the clamping capacitor C3, then to the sixth switch transistor Q6, then to the negative terminal of the direct-current power supply PV, then to the second capacitor C2, and then to the node N, the other one is from the node R to the diode connected in reverse-parallel to the seventh switch transistor Q7 or the body diode of the seventh switch transistor Q7, then to the clamping capacitor C3, then to the fifth switch transistor Q5, then to the tenth switch transistor Q10, then to the negative terminal of the direct-current power supply PV, then to the second capacitor C2, and then to the node N, with the output voltage $V_{RN}$ having a value of −Udc/4. For an reactive output, an reactive current path is correspondingly from the node N to the second capacitor C2, then to the negative terminal of the direct-current power supply PV, then to the sixth unidirectional element, then to the diode connected in reverse-parallel to the fifth switch transistor Q5 or the body diode of the fifth switch transistor Q5, then to the clamping capacitor C3, then to the seventh switch transistor Q7, and then to the node R, with the output voltage $V_{RN}$ having a value of −Udc/4.

In the eighth mode, the fifth switch transistor Q5, the sixth switch transistor Q6, the eighth switch transistor Q8 and the tenth switch transistor Q10 are in an on state, and the other switch transistors are in an off state.

In the eighth mode, two active current paths exist, one is from the node R to the eighth switch transistor Q8, then to the sixth switch transistor Q6, then to the negative terminal of the direct-current power supply PV, then to the second capacitor C2, and then to the node N, the other one is from the node R to the eighth switch transistor Q8, then to the fifth switch transistor Q5, then to the tenth switch transistor Q10, then to the negative terminal of the direct-current power supply PV, then to the second capacitor C2, and then to the node N, with the output voltage $V_{RN}$ having a value of −Udc/2. For an reactive output, an reactive current path is correspondingly from the node N to the second capacitor C2, then to the negative terminal of the direct-current power supply PV, then to the sixth unidirectional element, then to the diode connected in reverse-parallel to the fifth switch transistor Q5 or the body diode of the fifth switch transistor Q5, then to the diode connected in reverse-parallel to the eighth switch transistor Q8 or the body diode of the eighth switch transistor Q8, and then to the node R, with the output voltage $V_{RN}$ having a value of −Udc/2.

Figure 7:
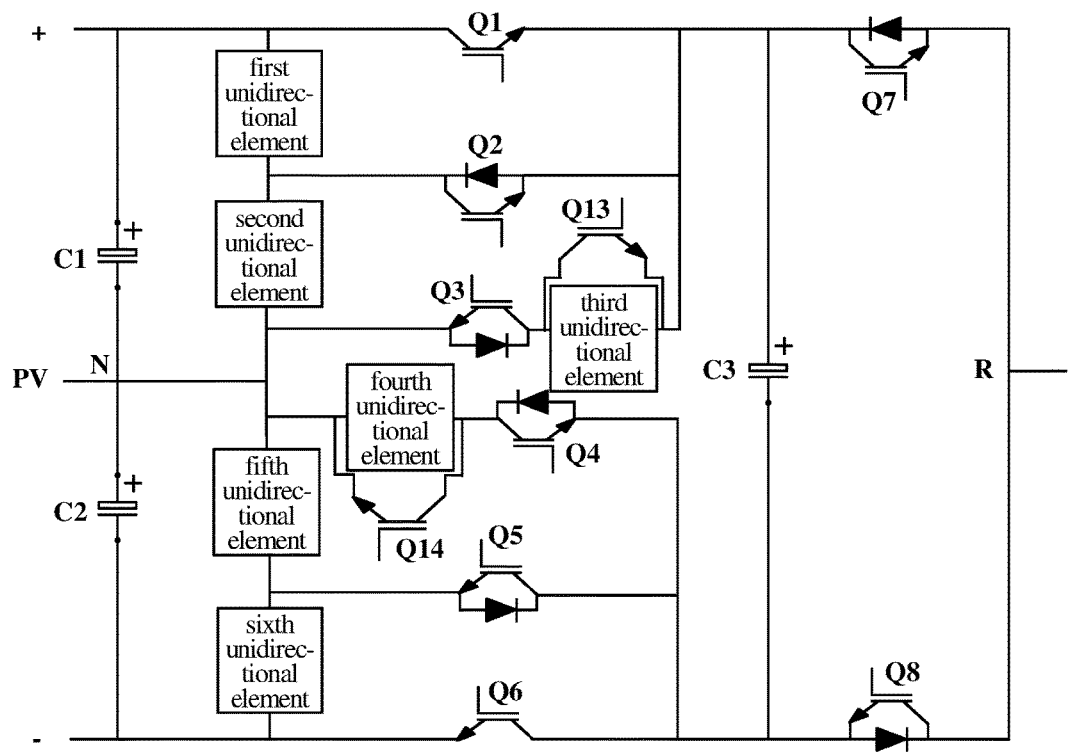
FIG. 7 is a schematic structural diagram of a five-level inverter according to still another embodiment in the present disclosure.

Alternatively, on the basis of the implementation as shown in FIG. 3, the five-level inverter further includes a thirteenth switch transistor Q13 connected in reverse-parallel to the third unidirectional element and a fourteenth switch transistor Q14 connected in reverse-parallel to the fourth unidirectional element, as shown in FIG. 7.

In this case, among the eight working modes of the five-level inverter, the first mode, the second mode, the seventh mode and the eighth mode of the five-level inverter are the same as those of the first type of five-level inverter as shown in FIG. 3, while the third mode, the fourth mode, the fifth mode and the sixth mode of the five-level inverter change accordingly as follows.

In the third mode, the fourth switch transistor Q4, the fifth switch transistor Q5, the seventh switch transistor Q7 and the fourteenth switch transistor Q14 are in an on state, and the other switch transistors are in an off state.

In this case, the reactive current path is changed to include two reactive current paths connected in parallel to each other, while the active current path and respective output voltages stay unchanged.

In the fourth mode, the fourth switch transistor Q4, the fifth switch transistor Q5, the eighth switch transistor Q8 and the fourteenth switch transistor Q14 are in an on state, and the other switch transistors are in an off state.

In this case, the reactive current path is changed to include two reactive current paths connected in parallel to each other, while the active current path and respective output voltages stay unchanged.

In the fifth mode, the second switch transistor Q2, the third switch transistor Q3, the seventh switch transistor Q7 and the thirteenth switch transistor Q13 are in an on state, and the other switch transistors are in an off state.

In this case, the reactive current path is changed to include two reactive current paths connected in parallel to each other, while the active current path and respective output voltages stay unchanged.

In the sixth mode, the second switch transistor Q2, the third switch transistor Q3, the eighth switch transistor Q8 and the thirteenth switch transistor Q13 are in an on state, and the other switch transistors are in an off state.

In this case, the reactive current path is changed to include two reactive current paths connected in parallel to each other, while the active current path and respective output voltages stay unchanged.

Alternatively, the five-level inverter further includes an eleventh switch transistor connected in reverse-parallel to the second unidirectional element and a twelfth switch transistor connected in reverse-parallel to the fifth unidirectional element.

In the case, the current paths change accordingly in the eight working modes of the five-level inverter under control of the switch transistors, which is not described in detail herein.

Preferable, each of the first type of five-level inverter, the second type of five-level inverter and the third type of five-level inverter includes two diodes connected in reverse-parallel to the first switch transistor and the sixth switch transistor respectively. Alternatively, each of the first switch transistor and the sixth switch transistor of each of the first type of five-level inverter, the second type of five-level inverter and the third type of five-level inverter further includes a body diode.

In the above embodiment, the first switch transistor and the sixth switch transistor may each be a unidirectional element, such as a switch transistor without a body diode or a reverse blocking switch transistor, while the second switch transistor, the third switch transistor, the fourth switch transistor, the fifth switch transistor, the seventh switch transistor and the eighth switch transistor may each be a switch transistor, such as an IGBT (Insulated Gate Bipolar Transistor) or a MOSFET (metallic oxide semiconductor field effect transistor), which has a body diode or is connected in reverse-parallel to a diode. Also, the first switch transistor and the sixth switch transistor may each be a bidirectional element, for example, a switch transistor, such as an IGBT or a MOSFET, which has a body diode or is connected in reverse-parallel to a diode.

The switch transistors can be selected depending on practical conditions, which is not limited herein. All the selections fall within the protection scope of the present disclosure.

Preferably, on the basis of the implementation as shown in FIG. 4, the five-level inverter further includes a fifteenth switch transistor connected in reverse-parallel to the first unidirectional element, a sixteenth switch transistor connected in reverse-parallel to the second unidirectional element, a seventeenth switch transistor connected in reverse-parallel to the fourth unidirectional element, and an eighteenth switch transistor connected in reverse-parallel to the fifth unidirectional element.

In this case, the current paths change accordingly in the eight working modes of the five-level inverter under control of the switch transistors, which is not described in detail herein.

Preferably, on the basis of implementations as shown in FIG. 4 and FIG. 5, the five-level inverter further includes a nineteenth switch transistor connected in reverse-parallel to the second unidirectional element and a twentieth switch transistor connected in reverse-parallel to the fifth unidirectional element.

In this case, the current paths change accordingly in the eight working modes of the five-level inverter under control of the switch transistors, which is not described in detail herein.

Alternatively, on the basis of implementations as shown in FIG. 4 and FIG. 5, the five-level inverter further includes a twenty-first switch transistor connected in reverse-parallel to the third unidirectional element and a twenty-second switch transistor connected in reverse-parallel to the fourth unidirectional element.

In this case, the current paths change accordingly in the eight working modes of the five-level inverter under control of the switch transistors, which is not described in detail herein.

Preferably, on the basis of the implementation as shown in FIG. 5, the five-level inverter further includes a twenty-third switch transistor connected in reverse-parallel to the first unidirectional element and a twenty-fourth switch transistor connected in reverse-parallel to the sixth unidirectional element.

In this case, the current paths change accordingly in the eight working modes of the five-level inverter under control of the switch transistors, which is not described in detail herein.

Preferably, in the above embodiments, each of the first unidirectional element, the second unidirectional element, the third unidirectional element, the fourth unidirectional element, the fifth unidirectional element and the sixth unidirectional element is a diode or a unidirectional thyristor.

In a case that each of the first unidirectional element, the second unidirectional element, the third unidirectional element, the fourth unidirectional element, the fifth unidirectional element and the sixth unidirectional element is a diode, the anode of the diode is the input terminal of the respective unidirectional element, and the cathode of the diode is the output terminal of the respective unidirectional element.

In a practical application, the unidirectional elements may be selected as unidirectional thyristors or the like, which may be determined depending on practical conditions. Any types of the unidirectional elements fall within the protection scope of the present disclosure.

Preferably, each of the second switch transistor, the third switch transistor, the fourth switch transistor and the fifth switch transistor includes a body diode or is connected in reverse-parallel to a diode.

It should be noted that, in a practical application, the connection relation between the third switch transistor and the third unidirectional element in the third switch branch and the connection relation between the fourth switch transistor and the fourth unidirectional element in the fourth switch branch are not limited to those in the above embodiments. Exchange of positions of the switch transistors and the unidirectional elements also fall within the protection scope of the present disclosure. Alternatively, each of the third switch branch and the fourth switch branch may be replaced by a reverse blocking switch transistor, which may be determined depending one practical conditions and also fall within the protection scope of the present disclosure.

Figure 8A:
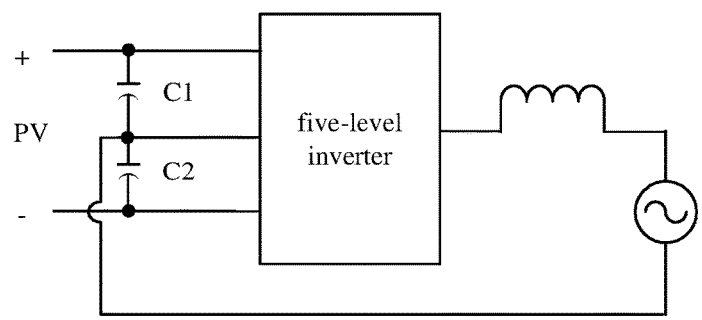
FIG. 8A and FIG. 8B are schematic application diagrams of a five-level inverter according to still another embodiment in the present disclosure.
Figure 8B:
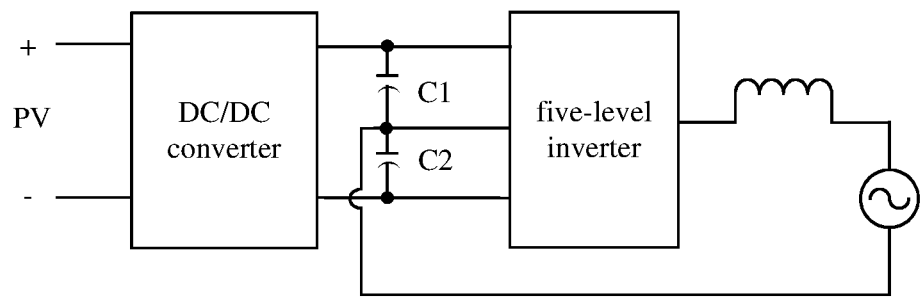

In a practical application as shown in FIG. 8A, the second input terminal and the output terminal of the five-level inverter may each be connected to a power grid through an element such as an inductor (and/or a capacitor). A DC/DC converter may be added at a front end of the five-level inverter to change the voltage, in order to widen the range of input voltage for the five-level inverter. Alternatively, as shown in FIG. 8B, not only a DC/DC converter is added at a front end of the five-level inverter to change the voltage, but also the second input terminal and the output terminal of the five-level inverter each are connected to a power grid through an element such as an inductor (and/or a capacitor).

Figure 9A:
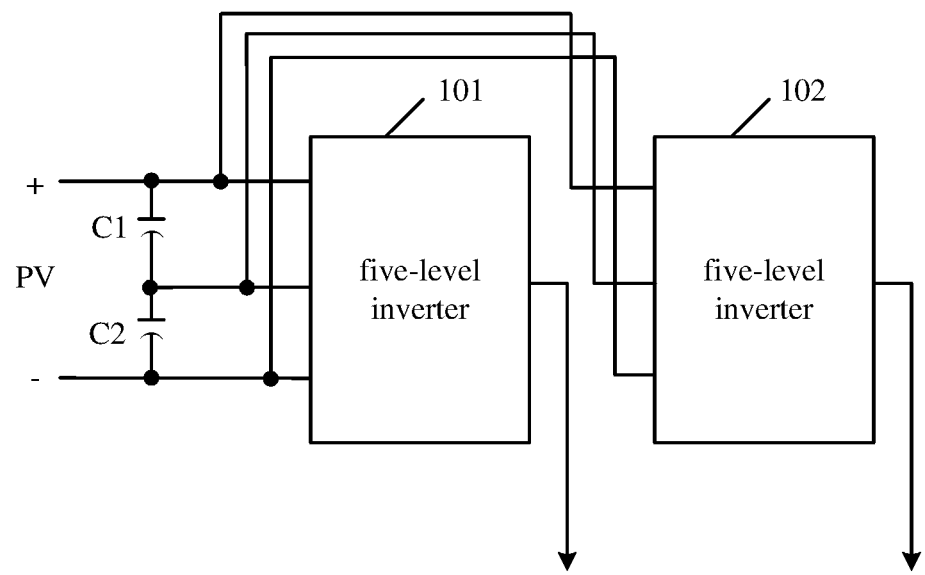
FIG. 9A and FIG. 9B are schematic application diagrams of a two-phase five-level inverter according to an embodiment in the present disclosure.

A five-level inverter application circuit is further provided according to an embodiment in the present disclosure. FIG. 9A shows a topological diagram of a two-phase five-level inverter according to the embodiment, which includes two five-level inverters according to the above embodiments, namely, a first five-level inverter 101 and a second five-level inverter 102.

A first input terminal of each of the first five-level inverter 101 and the second five-level inverter 102 is connected to the positive terminal of the direct-current power supply PV.

A second input terminal of each of the first five-level inverter 101 and the second five-level inverter 102 is connected to a connection point at which the first capacitor C1 is connected to the second capacitor C2.

A third input terminal of each of the first five-level inverter 101 and the second five-level inverter 102 is connected to the negative terminal of the direct-current power supply.

The output terminals of the first five-level inverter 101 and the output terminal of the second five-level inverter 102 are two alternating-current output terminals of the five-level inverter application circuit.

Specifically, the first five-level inverter 101 is modulated by a first sinusoidal wave, and the second five-level inverter 102 is modulated by a second sinusoidal wave.

The phases of the first sinusoidal wave and the second sinusoidal wave have a difference of 180 degree or 0 degree.

Figure 10A:
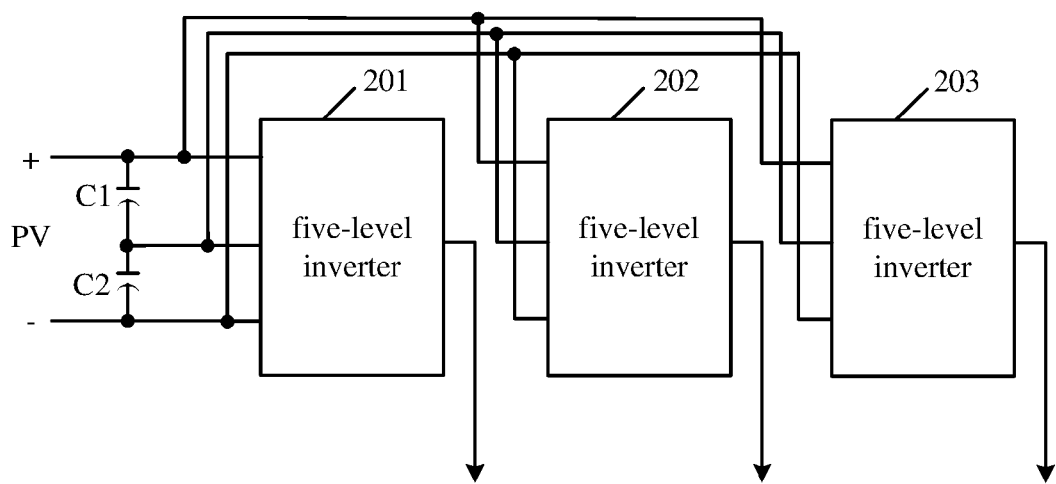
FIG. 10A and FIG. 10B are schematic application diagrams of a three-phase three-wire five-level inverter according to an embodiment in the present disclosure.

A five-level inverter application circuit is further provided according to another embodiment in the present disclosure. FIG. 10A shows a topological diagram of a three-phase three-wire five-level inverter according to the embodiment, which includes three five-level inverters according to the above embodiments, namely, a first five-level inverter 201, a second five-level inverter 202 and a third five-level inverter 203.

A first input terminal of each of the first five-level inverter 201, the second five-level inverter 202 and the third five-level inverter 203 is connected to the positive terminal of the direct-current power supply PV.

A second input terminal of each of the first five-level inverter 201, the second five-level inverter 202 and the third five-level inverter 203 is connected to a connection point at which the first capacitor C1 is connected to the second capacitor C2.

A third input terminal of each of the first five-level inverter 201, the second five-level inverter 202 and the third five-level inverter 203 is connected to the negative terminal of the direct-current power supply.

The output terminal of the first five-level inverter 201, the output terminal of the second five-level inverter 202 and the output terminal of the third five-level inverter 203 are three alternating-current output terminals of the five-level inverter application circuit.

Specifically, the first five-level inverter 201 is modulated by a first sinusoidal wave, the second five-level inverter 202 is modulated by a second sinusoidal wave, and the third five-level inverter 203 is modulated by a third sinusoidal wave.

The phases of any two of the first sinusoidal wave, the second sinusoidal wave and the third sinusoidal wave have a difference of 120 degrees.

Figure 11A:
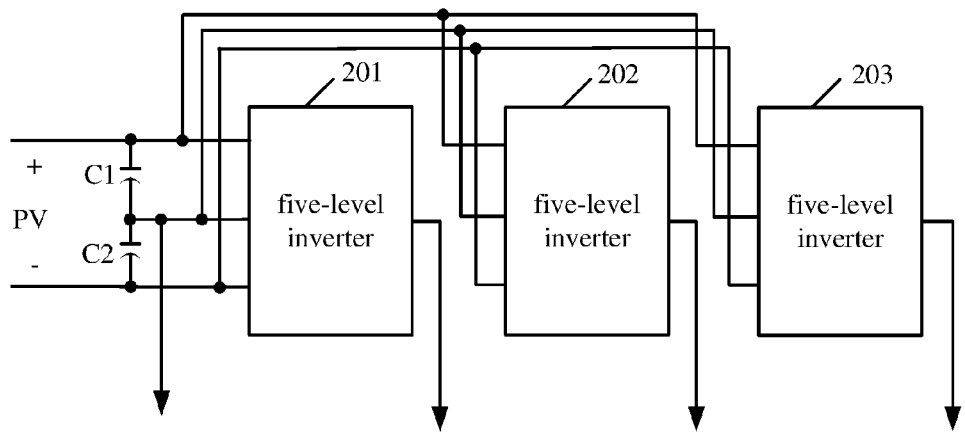
FIG. 11A and FIG. 11B are schematic application diagrams of a three-phase four-wire five-level inverter according to an embodiment in the present disclosure.

A five-level inverter application circuit is further provided according to another embodiment in the present disclosure. FIG. 11A shows a topological diagram of a three-phase four-wire five-level inverter according to the embodiment, which includes three five-level inverters according to the above embodiments, namely, a first five-level inverter 201, a second five-level inverter 202 and a third five-level inverter 203.

A first input terminal of each of the first five-level inverter 201, the second five-level inverter 202 and the third five-level inverter 203 is connected to the positive terminal of the direct-current power supply PV.

A second input terminal of each of the first five-level inverter 201, the second five-level inverter 202 and the third five-level inverter 203 is connected to a connection point at which the first capacitor C1 is connected to the second capacitor C2.

A third input terminal of each of the first five-level inverter 201, the second five-level inverter 202 and the third five-level inverter 203 is connected to the negative terminal of the direct-current power supply.

The output terminal of the first five-level inverter 201, the output terminal of the second five-level inverter 202 and the output terminal of the third five-level inverter 203 are three alternating-current output terminals of the five-level inverter application circuit.

The connection point at which the first capacitor C1 is connected to the second capacitor C2 is a fourth output terminal of the five-level inverter application circuit, which is connected to the three alternating-current output terminals through the power grid and an element such as an inductor and/or a capacitor, for example.

Specifically, the first five-level inverter 201 is modulated by a first sinusoidal wave, the second five-level inverter 202 is modulated by a second sinusoidal wave, and the third five-level inverter 203 is modulated by a third sinusoidal wave.

The phases of any two of the first sinusoidal wave, the second sinusoidal wave and the third sinusoidal wave have a difference of 120 degrees.

Figure 9B:
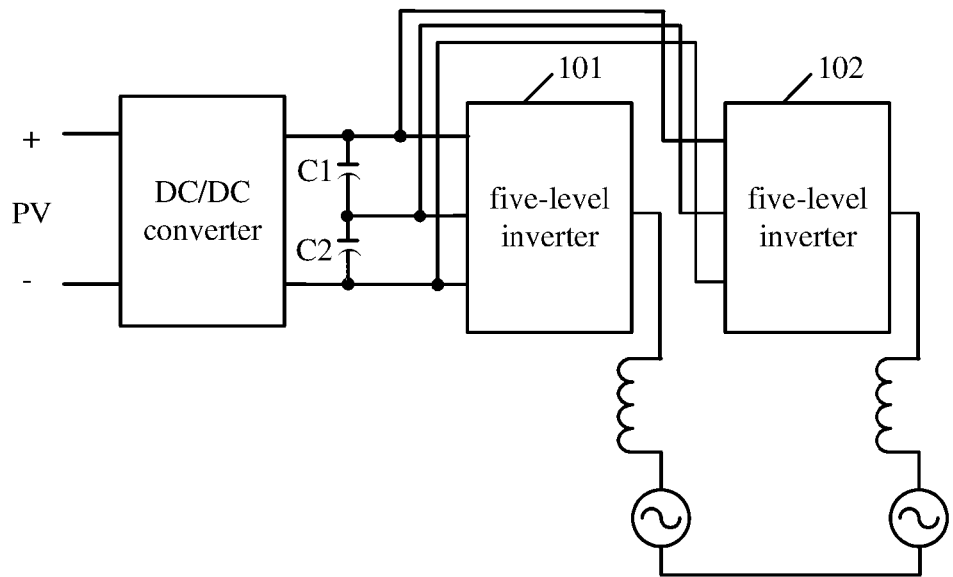
Figure 10B:
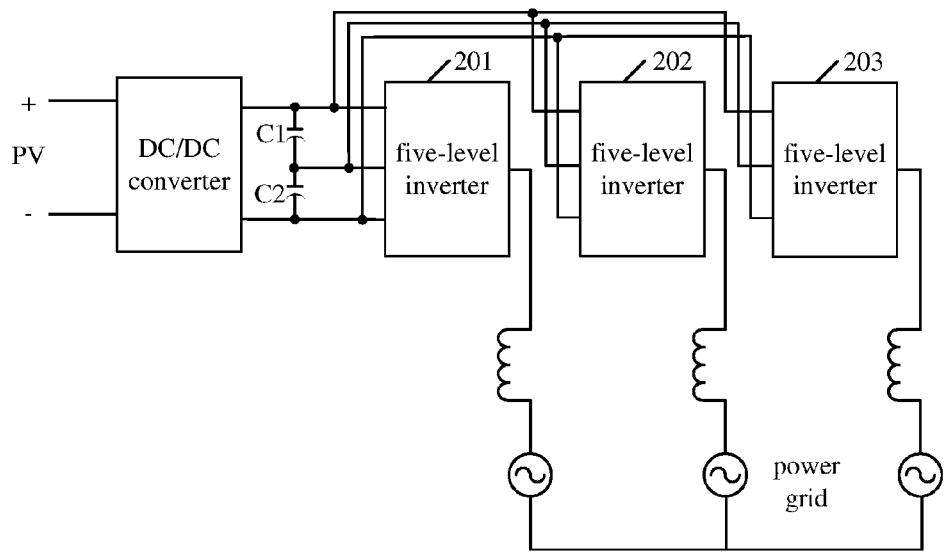
Figure 11B:
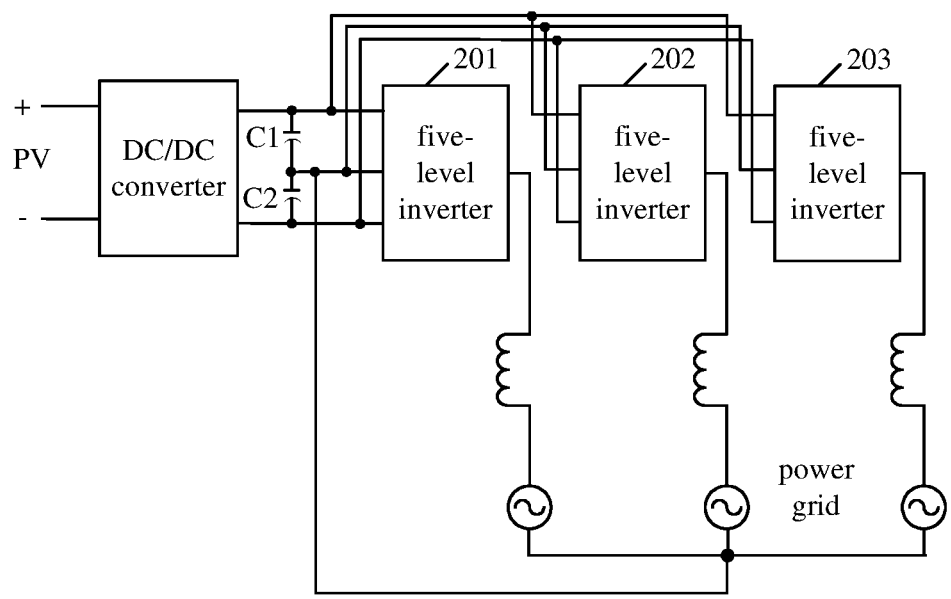

In a practical application, a DC/DC converter may be added at a front end of the five-level inverter application circuit to change the voltage, in order to widen the range of input voltage for the five-level inverter application circuit. The alternating-current output terminals of the five-level inverter application circuit may each be connected to a power grid through an element such as an inductor (and/or a capacitor, for example). Alternatively, as shown in FIGS. 9B, 10B and 11B, not only a DC/DC converter is added at a front end of the five-level inverter application circuit to change the voltage, but also the alternating-current output terminals of the five-level inverter application circuit are each connected to a power grid through an element such as an inductor.

The above five-level inverter application circuits may each be applied in a photovoltaic power generation system, in which the direct-current power supply is a photovoltaic battery assembly accordingly. Alternatively, the above five-level inverter application circuits may also be applied in other power generation system, which is not limed herein.

It should be noted that, the five-level inverter according to any of the embodiments in the present disclosure has the function of power capacitor voltage self-balance. It can be understood that a two-phase five-level inverter, a three-phase three-wire five-level inverter and a three-phase four-wire five-level inverter constituted by the five-level inverters also have the function.

The foregoing embodiments are only preferred embodiments and are not meant to be limiting. The preferred embodiments according to the disclosure are disclosed above, but are not intended to limit the disclosure. Those skilled in the art may make, based on the disclosed method and technical content, some variations and improvements on the technical solutions in the disclosure, or make some equivalent variations to the embodiments without departing from the scope of the technical solutions. All simple modifications, equivalent variations and improvements made based on the technical essence fall in the scope of the technical solutions in the disclosure.

The invention claimed is:

1. A five-level inverter, connected between a positive terminal and a negative terminal of a direct-current power supply, and connected in parallel to a branch in which a first capacitor is connected in series to a second capacitor, wherein the five-level inverter comprises:
   a first switch branch comprising a first unidirectional element and a first switch transistor, wherein a common terminal of the first unidirectional element and the first switch transistor is connected to a first terminal of the first capacitor;
   a second switch branch comprising a second unidirectional element and a second switch transistor, wherein a common terminal of the second unidirectional element and the second switch transistor is connected to a first terminal of the first switch branch;
   a third switch branch comprising a third unidirectional element and a third switch transistor, wherein a first terminal of the third switch branch is connected to a first terminal of the second switch branch, a second terminal of the first capacitor and a first terminal of the second capacitor;
   a fourth switch branch comprising a fourth unidirectional element and a fourth switch transistor, wherein a first terminal of the fourth switch branch is connected to the first terminal of the third switch branch;
   a fifth switch branch comprising a fifth unidirectional element and a fifth switch transistor, wherein a first terminal of the fifth switch branch is connected to the first terminal of the fourth switch branch;
   a sixth switch branch comprising a sixth unidirectional element and a sixth switch transistor, wherein a first terminal of the sixth switch branch is connected to a common terminal of the fifth unidirectional element and the fifth switch transistor, a common terminal of the sixth unidirectional element and the sixth switch transistor is connected to a second terminal of the second capacitor;
   a seventh switch transistor;
   an eighth switch transistor; and
   a clamping capacitor,
   wherein a first terminal of the clamping capacitor is connected to a second terminal of the first switch branch, a second terminal of the second switch branch, a second terminal of the third switch branch and a first terminal of the seventh switch transistor;
   wherein a second terminal of the clamping capacitor is connected to a second terminal of the fourth switch branch, a second terminal of the fifth switch branch, a second terminal of the sixth switch branch and a second terminal of the eighth switch transistor;
   wherein a first terminal of the eighth switch transistor is connected to a second terminal of the seventh switch transistor at a connection point connected to an output terminal of the five-level inverter; and
   wherein each of the seventh switch transistor and the eighth switch transistor is a switch transistor providing a bidirectional power path.

2. The five-level inverter according to claim 1, wherein:
   an input terminal of the second unidirectional element is the first terminal of the second switch branch;
   a second terminal of the second switch transistor is the second terminal of the second switch branch;
   a first terminal of the second switch transistor is connected to an output terminal of the second unidirectional element at a connection point connected to the first terminal of the first switch branch;
   a second terminal of the third switch transistor is the first terminal of the third switch branch;
   a first terminal of the third switch transistor is connected to an output terminal of the third unidirectional element;
   an input terminal of the third unidirectional element is the second terminal of the third switch branch;
   an input terminal of the fourth unidirectional element is the first terminal of the fourth switch branch;
   an output terminal of the fourth unidirectional element is connected to a first terminal of the fourth switch transistor;
   a second terminal of the fourth switch transistor is the second terminal of the fourth switch branch;
   an input terminal of the fifth unidirectional element is connected to a second terminal of the fifth switch transistor at a connection point connected to the first terminal of the sixth switch branch;
   an output terminal of the fifth unidirectional element is the first terminal of the fifth switch branch; and
   a first terminal of the fifth switch transistor is the second terminal of the fifth switch branch.

3. The five-level inverter according to claim 2, wherein:
   an output terminal of the first unidirectional element is connected to a first terminal of the first switch transistor at a connection point connected to the first terminal of the first capacitor;
   an input terminal of the first unidirectional element is the first terminal of the first switch branch;
   a second terminal of the first switch transistor is the second terminal of the first switch branch;
   an input terminal of the sixth unidirectional element is connected to a second terminal of the sixth switch transistor at a connection point connected to the second terminal of the second capacitor;
   an output terminal of the sixth unidirectional element is the first terminal of the sixth switch branch;
   a first terminal of the sixth switch transistor is the second terminal of the sixth switch branch; and
   each of the second switch transistor, the third switch transistor, the fourth switch transistor and the fifth switch transistor comprises a body diode or is connected in reverse-parallel to a diode.

4. The five-level inverter according to claim 3, wherein the five-level inverter operates in one of the following eight working modes:
   a first mode, in which the first switch transistor and the seventh switch transistor are in an on state, and the other switch transistors are in an off state;
   a second mode, in which the first switch transistor and the eighth switch transistor are in an on state, and the other switch transistors are in an off state;
   a third mode, in which the fourth switch transistor, the fifth switch transistor and the seventh switch transistor are in an on state, and the other switch transistors are in an off state;
   a fourth mode, in which the fourth switch transistor, the fifth switch transistor and the eighth switch transistor are in an on state, and the other switch transistors are in an off state;
   a fifth mode, in which the second switch transistor, the third switch transistor and the seventh switch transistor are in an on state, and the other switch transistors are in an off state;

a sixth mode, in which the second switch transistor, the third switch transistor and the eighth switch transistor are in an on state, and the other switch transistors are in an off state;

a seventh mode, in which the sixth switch transistor and the seventh switch transistor are in an on state, and the other switch transistors are in an off state; and an eighth mode, in which the sixth switch transistor and the eighth switch transistor are in an on state, and the other switch transistors are in an off state.

5. The five-level inverter according to claim 3, wherein: the five-level inverter further comprises:
   a ninth switch transistor connected in reverse-parallel to the first unidirectional element; and
   a tenth switch transistor connected in reverse-parallel to the sixth unidirectional element; or
the five-level inverter further comprises:
   an eleventh switch transistor connected in reverse-parallel to the second unidirectional element; and
   a twelfth switch transistor connected in reverse-parallel to the fifth unidirectional element; or
the five-level inverter further comprises:
   a thirteenth switch transistor connected in reverse-parallel to the third unidirectional element; and
   a fourteenth switch transistor connected in reverse-parallel to the fourth unidirectional element.

6. The five-level inverter according to claim 3, wherein: the five-level inverter further comprises two diodes connected in reverse-parallel to the first switch transistor and the sixth switch transistor respectively; or
each of the first switch transistor and the sixth switch transistor further comprises a body diode.

7. A five-level inverter application circuit, comprising first and second five-level inverters according to claim 3, wherein:
   a first input terminal of each of the first five-level inverter and the second five-level inverter is connected to the positive terminal of the direct-current power supply;
   a second input terminal of each of the first five-level inverter and the second five-level inverter is connected to a connection point at which the first capacitor is connected to the second capacitor;
   a third input terminal of each of the first five-level inverter and the second five-level inverter is connected to the negative terminal of the direct-current power supply; and
   the output terminal of the first five-level inverter and the output terminal of the second five-level inverter are two alternating-current output terminals of the five-level inverter application circuit.

8. A five-level inverter application circuit, comprising first, second and third five-level inverters according to claim 3, wherein:
   a first input terminal of each of the first five-level inverter, the second five-level inverter and the third five-level inverter is connected to the positive terminal of the direct-current power supply;
   a second input terminal of each of the first five-level inverter, the second five-level inverter and the third five-level inverter is connected to a connection point at which the first capacitor is connected to the second capacitor;
   a third input terminal of each of the first five-level inverter, the second five-level inverter and the third five-level inverter is connected to the negative terminal of the direct-current power supply; and
   the output terminal of the first five-level inverter, the output terminal of the second five-level inverter and the output terminal of the third five-level inverter are three alternating-current output terminals of the five-level inverter application circuit.

9. The five-level inverter application circuit according to claim 8, further comprising a fourth output terminal which is the connection point at which the first capacitor is connected to the second capacitor.

10. The five-level inverter according to claim 2, wherein:
    an output terminal of the first unidirectional element is connected to a first terminal of the first switch transistor at a connection point connected to the first terminal of the first capacitor;
    a second terminal of the first switch transistor is the first terminal of the first switch branch;
    an input terminal of the first unidirectional element is the second terminal of the first switch branch;
    an input terminal of the sixth unidirectional element is connected to a second terminal of the sixth switch transistor at a connection point connected to the second terminal of the second capacitor;
    a first terminal of the sixth switch transistor is the first terminal of the sixth switch branch; and
    an output terminal of the sixth unidirectional element is the second terminal of the sixth switch branch,
    wherein each of the second switch transistor, the third switch transistor, the fourth switch transistor and the fifth switch transistor comprises a body diode or is connected in reverse-parallel to a diode.

11. The five-level inverter according to claim 10, wherein the five-level inverter operates in one of the following eight working modes:
    a first mode, in which the first switch transistor, the second switch transistor and the seventh switch transistor are in an on state, and the other switch transistors are in an off state;
    a second mode, in which the first switch transistor, the second switch transistor and the eighth switch transistor are in an on state, and the other switch transistors are in an off state;
    a third mode, in which the fourth switch transistor, the fifth switch transistor and the seventh switch transistor are in an on state, and the other switch transistors are in an off state;
    a fourth mode, in which the fourth switch transistor, the fifth switch transistor and the eighth switch transistor are in an on state, and the other switch transistors are in an off state;
    a fifth mode, in which the second switch transistor, the third switch transistor and the seventh switch transistor are in an on state, and the other switch transistors are in an off state;
    a sixth mode, in which the second switch transistor, the third switch transistor and the eighth switch transistor are in an on state, and the other switch transistors are in an off state;
    a seventh mode, in which the fifth switch transistor, the sixth switch transistor and the seventh switch transistor are in an on state, and the other switch transistors are in an off state; and
    an eighth mode, in which the fifth switch transistor, the sixth switch transistor and the eighth switch transistor are in an on state, and the other switch transistors are in an off state.

12. The five-level inverter according to claim 10, wherein:
the five-level inverter further comprises two diodes connected in reverse-parallel to the first switch transistor and the sixth switch transistor respectively; or
each of the first switch transistor and the sixth switch transistor further comprises a body diode.

13. The five-level inverter according to claim 10, wherein:
the five-level inverter further comprises:
a nineteenth switch transistor connected in reverse-parallel to the second unidirectional element; and
a twentieth switch transistor connected in reverse-parallel to the fifth unidirectional element; or
the five-level inverter further comprises:
a twenty-first switch transistor connected in reverse-parallel to the third unidirectional element; and
a twenty-second switch transistor connected in reverse-parallel to the fourth unidirectional element.

14. The five-level inverter according to claim 10, further comprising:
a twenty-third switch transistor connected in reverse-parallel to the first unidirectional element; and
a twenty-fourth switch transistor connected in reverse-parallel to the sixth unidirectional element.

15. A five-level inverter application circuit, comprising first and second five-level inverters according to claim 10, wherein:
a first input terminal of each of the first five-level inverter and the second five-level inverter is connected to the positive terminal of the direct-current power supply;
a second input terminal of each of the first five-level inverter and the second five-level inverter is connected to a connection point at which the first capacitor is connected to the second capacitor;
a third input terminal of each of the first five-level inverter and the second five-level inverter is connected to the negative terminal of the direct-current power supply; and
the output terminal of the first five-level inverter and the output terminal of the second five-level inverter are two alternating-current output terminals of the five-level inverter application circuit.

16. A five-level inverter application circuit, comprising first, second and third five-level inverters according to claim 10, wherein:
a first input terminal of each of the first five-level inverter, the second five-level inverter and the third five-level inverter is connected to the positive terminal of the direct-current power supply;
a second input terminal of each of the first five-level inverter, the second five-level inverter and the third five-level inverter is connected to a connection point at which the first capacitor is connected to the second capacitor;
a third input terminal of each of the first five-level inverter, the second five-level inverter and the third five-level inverter is connected to the negative terminal of the direct-current power supply; and
the output terminal of the first five-level inverter, the output terminal of the second five-level inverter and the output terminal of the third five-level inverter are three alternating-current output terminals of the five-level inverter application circuit.

17. The five-level inverter according to claim 1, wherein:
a second terminal of the second switch transistor is the first terminal of the second switch branch;
an input terminal of the second unidirectional element is the second terminal of the second switch branch;
a first terminal of the second switch transistor is connected to an output terminal of the second unidirectional element at a connection point connected to the first terminal of the first switch branch;
an input terminal of the third unidirectional element is the first terminal of the third switch branch;
an output terminal of the third unidirectional element is connected to a first terminal of the third switch transistor;
a second terminal of the third switch transistor is the second terminal of the third switch branch;
a second terminal of the fourth switch transistor is the first terminal of the fourth switch branch;
a first terminal of the fourth switch transistor is connected to an output terminal of the fourth unidirectional element;
an input terminal of the fourth unidirectional element is the second terminal of the fourth switch branch;
a second terminal of the fifth switch transistor is connected to an input terminal of the fifth unidirectional element at a connection point connected to the first terminal of the sixth switch branch;
a first terminal of the fifth switch transistor is the first terminal of the fifth switch branch; and
an output terminal of the fifth unidirectional element is the second terminal of the fifth switch branch.

18. The five-level inverter according to claim 17, wherein:
an output terminal of the first unidirectional element is connected to a first terminal of the first switch transistor at a connection point connected to the first terminal of the first capacitor;
an input terminal of the first unidirectional element is the first terminal of the first switch branch;
a second terminal of the first switch transistor is the second terminal of the first switch branch;
an input terminal of the sixth unidirectional element is connected to a second terminal of the sixth switch transistor at a connection point connected to the second terminal of the second capacitor;
an output terminal of the sixth unidirectional element is the first terminal of the sixth switch branch; and
a first terminal of the sixth switch transistor is the second terminal of the sixth switch branch,
wherein each of the second switch transistor, the third switch transistor, the fourth switch transistor and the fifth switch transistor comprises a body diode or is connected in reverse-parallel to a diode.

19. The five-level inverter according to claim 18, wherein the five-level inverter operates in one of the following eight working modes:
a first mode, in which the first switch transistor and the seventh switch transistor are in an on state, and the other switch transistors are in an off state;
a second mode, in which the first switch transistor and the eighth switch transistor are in an on state, and the other switch transistors are in an off state;
a third mode, in which the fourth switch transistor, the fifth switch transistor and the seventh switch transistor are in an on state, and the other switch transistors are in an off state;
a fourth mode, in which the fourth switch transistor, the fifth switch transistor and the eighth switch transistor are in an on state, and the other switch transistors are in an off state;

a fifth mode, in which the second switch transistor, the third switch transistor and the seventh switch transistor are in an on state, and the other switch transistors are in an off state;

a sixth mode, in which the second switch transistor, the third switch transistor and the eighth switch transistor are in an on state, and the other switch transistors are in an off state;

a seventh mode, in which the sixth switch transistor and the seventh switch transistor are in an on state, and the other switch transistors are in an off state; and an eighth mode, in which the sixth switch transistor and the eighth switch transistor are in an on state, and the other switch transistors are in an off state.

20. The five-level inverter according to claim 18, wherein:
the five-level inverter further comprises two diodes connected in reverse-parallel to the first switch transistor and the sixth switch transistor respectively; or
each of the first switch transistor and the sixth switch transistor further comprises a body diode.

21. The five-level inverter according to claim 18, further comprising:
a fifteenth switch transistor connected in reverse-parallel to the first unidirectional element;
a sixteenth switch transistor connected in reverse-parallel to the second unidirectional element;
a seventeenth switch transistor connected in reverse-parallel to the fourth unidirectional element; and
an eighteenth switch transistor connected in reverse-parallel to the fifth unidirectional element.

22. The five-level inverter according to claim 18, wherein:
the five-level inverter further comprises:
a nineteenth switch transistor connected in reverse-parallel to the second unidirectional element; and
a twentieth switch transistor connected in reverse-parallel to the fifth unidirectional element; or
the five-level inverter further comprises:
a twenty-first switch transistor connected in reverse-parallel to the third unidirectional element; and
a twenty-second switch transistor connected in reverse-parallel to the fourth unidirectional element.

23. A five-level inverter application circuit, comprising first and second five-level inverters according to claim 18, wherein:
a first input terminal of each of the first five-level inverter and the second five-level inverter is connected to the positive terminal of the direct-current power supply;
a second input terminal of each of the first five-level inverter and the second five-level inverter is connected to a connection point at which the first capacitor is connected to the second capacitor;
a third input terminal of each of the first five-level inverter and the second five-level inverter is connected to the negative terminal of the direct-current power supply; and
the output terminal of the first five-level inverter and the output terminal of the second five-level inverter are two alternating-current output terminals of the five-level inverter application circuit.

24. A five-level inverter application circuit, comprising first, second and third five-level inverters according to claim 18, wherein:
a first input terminal of each of the first five-level inverter, the second five-level inverter and the third five-level inverter is connected to the positive terminal of the direct-current power supply;
a second input terminal of each of the first five-level inverter, the second five-level inverter and the third five-level inverter is connected to a connection point at which the first capacitor is connected to the second capacitor;
a third input terminal of each of the first five-level inverter, the second five-level inverter and the third five-level inverter is connected to the negative terminal of the direct-current power supply; and
the output terminal of the first five-level inverter, the output terminal of the second five-level inverter and the output terminal of the third five-level inverter are three alternating-current output terminals of the five-level inverter application circuit.

* * * * *